United States Patent [19]

Fujita et al.

[11] Patent Number: 5,074,583
[45] Date of Patent: Dec. 24, 1991

[54] AIR BAG SYSTEM FOR AUTOMOBILE

[75] Inventors: Satoshi Fujita; Masato Sato, both of Hiroshima; Hisao Muramoto, Yamaguchi, all of Japan

[73] Assignee: Mazda Motor Corporation, Hiroshima, Japan

[21] Appl. No.: 386,431

[22] Filed: Jul. 28, 1989

[30] Foreign Application Priority Data

| Jul. 29, 1988 | [JP] | Japan | 63-191350 |
| Jul. 29, 1988 | [JP] | Japan | 63-191347 |
| Jul. 29, 1988 | [JP] | Japan | 63-191348 |
| Jul. 29, 1988 | [JP] | Japan | 63-191349 |
| Aug. 29, 1988 | [JP] | Japan | 63-214254 |

[51] Int. Cl.$^5$ .............................................. B60R 21/32
[52] U.S. Cl. .................................... 280/735; 280/731; 280/732; 280/730; 180/271
[58] Field of Search ............... 180/271, 272, 273; 280/727, 728, 730, 732, 735

[56] References Cited

U.S. PATENT DOCUMENTS

| 3,687,213 | 8/1972 | Sato et al. ............... 180/82 |
| 3,703,300 | 11/1972 | Gillund et al. ............ 280/735 |
| 3,741,584 | 6/1973 | Arai ........................... 180/98 |
| 3,767,228 | 10/1973 | Lewis ......................... 280/135 |
| 3,851,305 | 11/1974 | Baba et al. ................ 180/103 |
| 3,874,695 | 4/1975 | Abe et al. .................. 280/735 |
| 3,884,497 | 5/1975 | Massengill et al. ....... 280/730 |
| 3,910,595 | 10/1975 | Katter et al. ............. 280/732 |
| 3,911,391 | 10/1975 | Held et al. ................ 180/103 |
| 3,966,224 | 6/1976 | Campbell et al. ......... 180/103 |
| 4,359,715 | 11/1982 | Langer et al. ............. 180/271 |
| 4,620,721 | 11/1986 | Scholtz et al. ............ 280/735 |
| 4,625,329 | 11/1986 | Ishikawa et al. .......... 180/271 |
| 4,678,058 | 7/1987 | Wooters .................... 180/273 |
| 4,706,990 | 11/1987 | Stevens ..................... 280/728 |
| 4,722,550 | 2/1988 | Imaoka et al. ............ 280/727 |

FOREIGN PATENT DOCUMENTS

| 2153601 | 5/1972 | Fed. Rep. of Germany . |
| 2628815 | 1/1978 | Fed. Rep. of Germany . |
| 1467769 | 3/1977 | United Kingdom . |

Primary Examiner—Kenneth R. Rice
Attorney, Agent, or Firm—Fleit, Jacobson, Cohn, Price, Holman & Stern

[57] ABSTRACT

An air bag system for an automobile comprises a collision detector for detecting a collision of the automobile, an inflater for generating gas under pressure, based on an output from the collision detector, and air bag device, mounted on a front body member located in front of a seat, for receiving the gas from the gas generator, the gas causing the air bag device to take a predetermined inflated configuration. A seating condition sensor detects a seating condition of a passenger seated on the seat, taking into consideration seat position, reclining angle, passenger size, and posture. A control unit controls operation of the air bag device, in accordance with the seating condition of the passenger, so that the air bag inflated is brought into an optimal contact with the passenger.

36 Claims, 27 Drawing Sheets

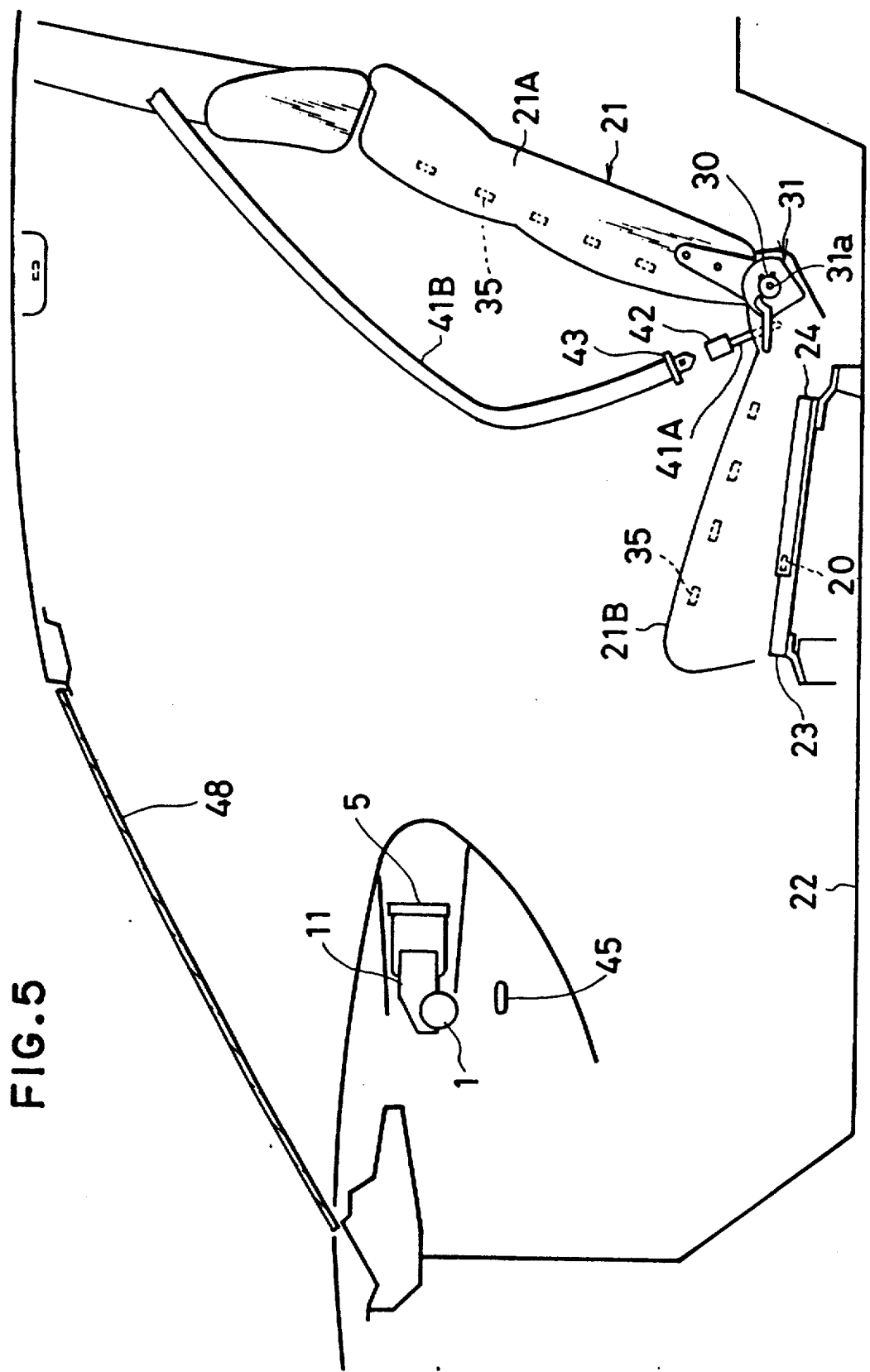

| SITUATION | SEAT SWITCH | OBJECT DETECTOR | RELIEF VALUE |
|---|---|---|---|
| 1 | ON | ON | OPEN |
| 2 | ON | OFF | CLOSE |
| 3 | OFF | ON | OPEN |
| 4 | OFF | OFF | NO INFLATION |

AIR BAG SYSTEM FOR AUTOMOBILE

BACKGROUND OF THE INVENTION

1. Field of the Invention

The present invention relates to an air bag system for an automobile, and more specifically, to a control for the air bag system.

2. Description of the Prior Art

Conventionally, there has been known an automobile equipped with an air bag system for preventing a passenger from being injured in case of a collision. Japanese Patent Publication No. 52-5128 discloses an air bag system in which an air bag for absorbing a collision shock is inflated by means of an inflator actuated electrically in the case of a collision so as to contact with a passenger's breast. As a result, a crash energy caused by the collision is absorbed by the inflated air bag so that the passenger is prevented from a shock of the collision and therefore kept safe.

U.S. Pat. No. 3,911,391 discloses an air bag system in which a vehicle speed is sensed by a sensor and an operation of the air bag system is controlled in accordance with the vehicle speed sensed.

U.S. Pat. No. 3,851,305 discloses an air bag system which is controlled in accordance with signals from a deceleration sensor and a collision sensor.

U.S. Pat. No. 4,359,715 discloses a diagnostic system for an air bag system.

U.S. Pat. No. 3,687,213 discloses a control system for controlling an air bag system based on radio signals.

U.S. Pat. No. 3,741,584 discloses an air bag system provided with separate inflation passages actuated independently.

U.S. Pat. No. 3,966,224 discloses an air bag system provided with a plurality of inflation volumes actuated by respective impacts.

U.S. Pat. No. 3,874,695 discloses an air bag system in which a gas generator is stepwise actuated in accordance with impact levels.

It should, however, be noted that these conventional air bag systems are disadvantageous in adaptability. Generally, an air bag in such systems is mounted so as to be stationary on a car. An inflating time period is basically constant. In addition, a timing of initiation of inflation is not controllable. On the other hand, a seating condition of a passenger on a seat in the car usually varies, person, to person changing a distance between the passenger and the air bag. It follows that a timing when the air bag contacts with the passenger's breast varies depending on a seating condition of the passenger in case of collision and that the air bag may not contact with the passenger's breast in some cases. Thus, the conventional air bag system is not reliable in protecting the passenger.

SUMMARY OF THE INVENTION

It is, therefore, an object of the present invention to provide an air bag system for an automobile which is reliable in case of collision.

It is another object of the present invention to provide an air bag system which can protect a passenger, irrespective of his seating condition.

It is still another object of the present invention to provide a control for an air bag system in which an inflated air bag surely contacts with a passenger's breast to absorb a crash energy of a collision.

The above and other objects of the invention can be accomplished by an air bag system for an automobile comprising collision detecting means for detecting a collision of the automobile, gas generating means for generating a gas under pressure, based on an output of said collision detecting means, shock absorbing bag means mounted on a front body member located in front of a seat for receiving the gas from the gas generator to take a predetermined inflated configuration, seating condition detecting means for detecting a seating condition of a passenger seated on the seat, control means for controlling an operation of the shock absorbing bag means in accordance with the seating condition of the passenger so that the shock absorbing bag means when inflated, is brought into an optimal contact with the passenger.

In one preferred embodiment of the present invention, the seating condition detecting means detects a reclining angle of the seat of the passenger. The seating condition detecting means may detect a size and a posture of the passenger and a position of the passenger in the seat. The seating condition detecting means may detect whether or not the passenger puts a seat belt on. Alternatively, the seating condition detecting means may detect a position of the seat which is slidably mounted on the automobile in a longitudinal direction thereof.

The control means may control a time period between a collision and a finish of an inflation of the shock absorbing bag means. In this case, the control means may control a supply of the gas under pressure from the gas generating means introduced into the shock absorbing bag means to adjust a gas pressure from the gas generating means. In such a gas supply control, the number of gas discharging passages through which the gas under pressure is introduced into the shock absorbing bag means is controlled. Alternatively, a gas pressure from the gas discharging passage may be made for controlling the gas supply.

In another preferred embodiment, the control means may control a time period between a collision and an initiation of the gas supply. The control means may control a position of the shock absorbing bag means in the longitudinal direction of the automobile to thereby control a distance between the shock absorbing bag means and the passenger.

Preferably, the control means may control the position of the shock absorbing bag means during the time period between the collision and the finish of the inflation of the shock absorbing bag means. In this case, the control means controls a position of the front body member in the longitudinal direction on which the shock absorbing bag means is mounted. Alternatively the control means may control the position of the shock absorbing bag means in an up and down direction of the automobile by providing the front body member with a swingable movement about an transverse axis.

In a further preferred embodiment, the control means may control a quantity of the gas introduced into the shock absorbing bag means.

In a still further embodiment of the present invention, the air bag system is provided with collision speed detecting means for detecting a speed of the collision, based on a signal from the collision detecting means. In this embodiment, the control means controls a time period between the collision and an initiation of the inflation based on the speed of the collision.

Preferably, the control means may control a generation of the gas in accordance with a room temperature in a passenger compartment.

According to the present invention, the shock absorbing bag means or air bag means is brought into contact with the passenger's breast irrespective of the seating condition of the passenger when the automobile is involved in a collision so that the air bag system weakens a crash energy transferring to the passenger and keeps him safe.

The above and other features of the present invention will be apparent from the following description, taking reference to the accompanying drawings.

BRIEF DESCRIPTION OF THE DRAWINGS

FIG. 5 is a sectional side view showing the seat and various sensors for sensing a seating condition of a passenger;

DESCRIPTION OF THE PREFERRED EMBODIMENT

Figure 1:
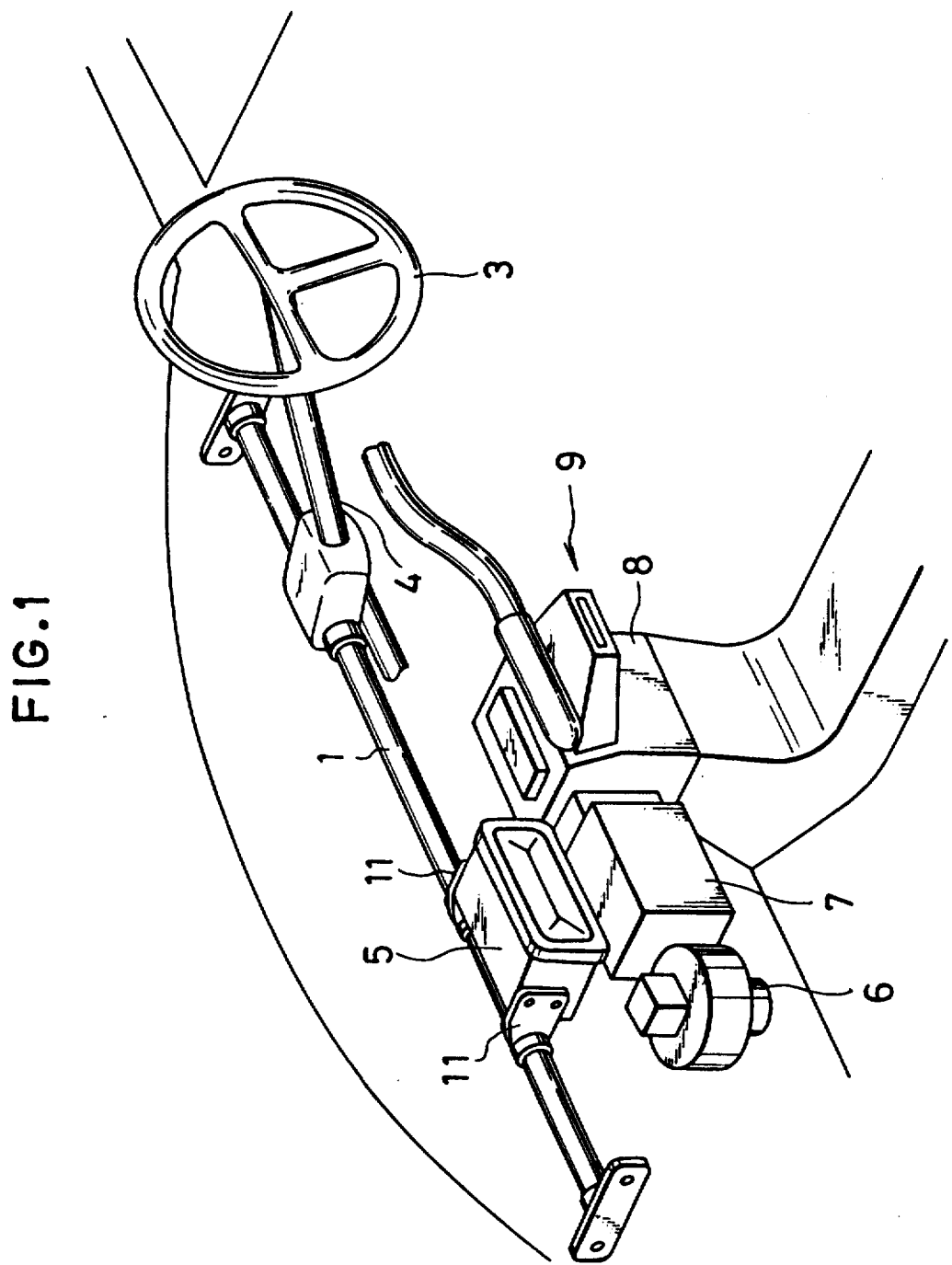
FIG. 1 is a perspective view showing a inside of a passenger compartment of an automobile provided with an air bag system in accordance with a preferred embodiment of the present invention.

Referring to the drawings, specifically to FIGS. 1, there is shown an inside view of a front portion of a passenger compartment of an automobile. A bar-like steering support member 1 disposed between opposite cowl side panels and extending in a transverse direction of the automobile is provided for supporting a steering shaft 4 and a steering wheel mounted on a tip end of the steering shaft 4. An air bag device 5 is mounted on the steering support member 1 spaced from the steering shaft 4 transversely toward an assistant driver's seat. The cowl side panels are of high rigidity not to be remarkably deformed in case of a collision. The steering support member 1 is also rigid enough to resist against a crash energy caused by collision. There is disposed an air conditioning system 9 including a blower unit 6, a cooler unit 7 and a heater unit 8 underneath the air bag device 5.

Figure 2:
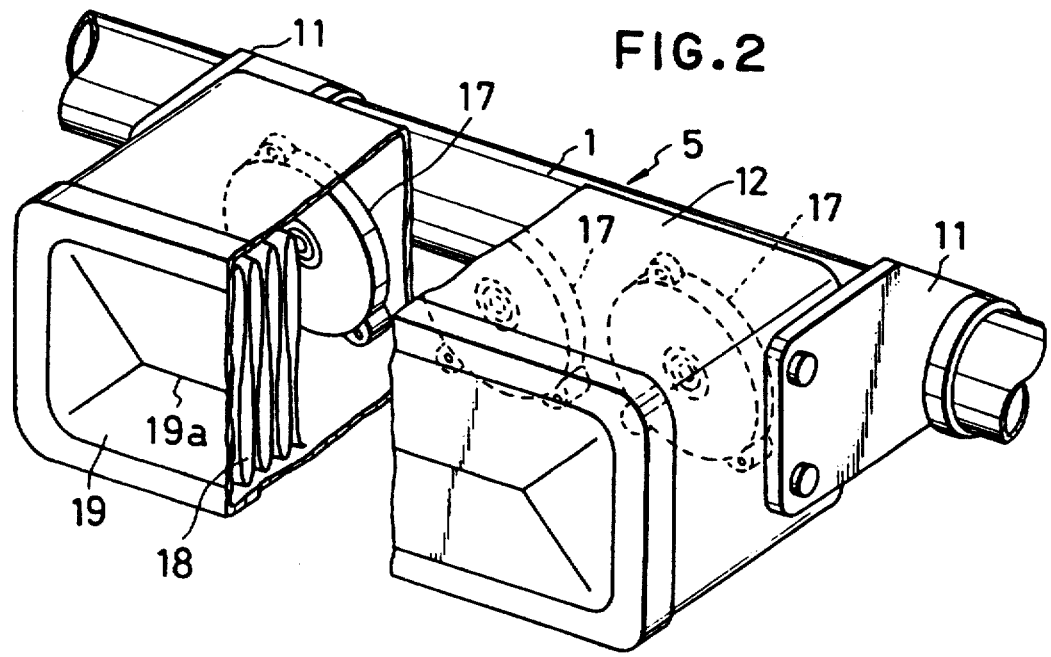
FIG. 2 is a perspective view showing specifically the air bag system.

As clearly shown in FIG. 2, the air bag device 5 is provided with a casing 12 connected with a pair of brackets 11, 11 at opposite sides. The brackets 11, 11 are rigidly mounted on the steering support member 1.

The air bag device 5 is provided in the casing 12 with three inflaters 17, 17, 17 for producing a gas under pressure, an air bag or shock absorbing bag 18 which is folded in a normal condition and receives the gas from the inflaters 17, 17, 17 to take a predetermined inflated configuration in case of a collision. The inflaters 17, 17, 17 are adapted to be actuated by a control signal from a control unit 70 based on an output of a collision detector 50 constituted by front sensors 51, 52 and rear sensors 54, 55.

Figure 3:
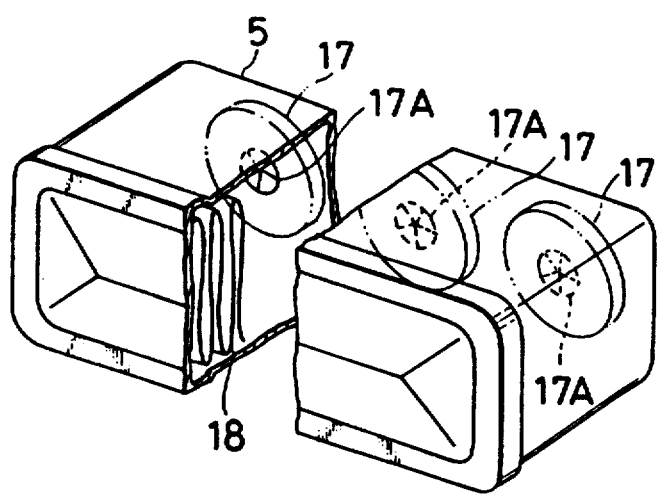
FIG. 3 is a perspective view showing the air bag system similar to FIG. 2.
Figure 4A:
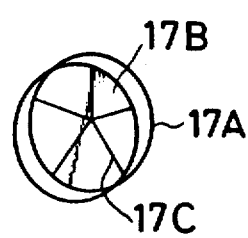
FIGS. 4(a), and 4(b) are views showing diaphragm valve employed for the air bag system.
Figure 4B:
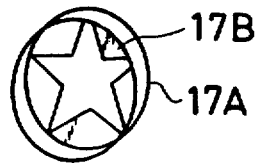

As shown in FIG. 3, the inflater 17 is provided with a discharge valve 17A having a diaphragm 17B formed with cut portions 17C. The valve 17A is normally closed as shown in FIG. 4(a) wherein each petal-like portion of the diaphragm 17B contact with each other. The valve 17A is opened when a pressure more than a predetermined value acts thereon in a manner that each petal-like portion of the diaphragm 17B is spaced from each other as shown in FIG. 4(b). The predetermined pressure of the valve 17A may be controlled in accordance with a material of the diaphragm 17A, depth and number of the cut portions and/or a thickness of the diaphragm 17A. The air bag device 5 is provided at a tip end portion of the casing 12 with a cover 19 facing to a passenger for retaining the air bag 18 within the casing 12 in a normal condition of the automobile. The cover 19 is formed with cut out portions through which the air bag 18 projects from the case toward the passenger in response to an operation of the inflater 17 when the automobile is involved in a collision.

Figure 6:
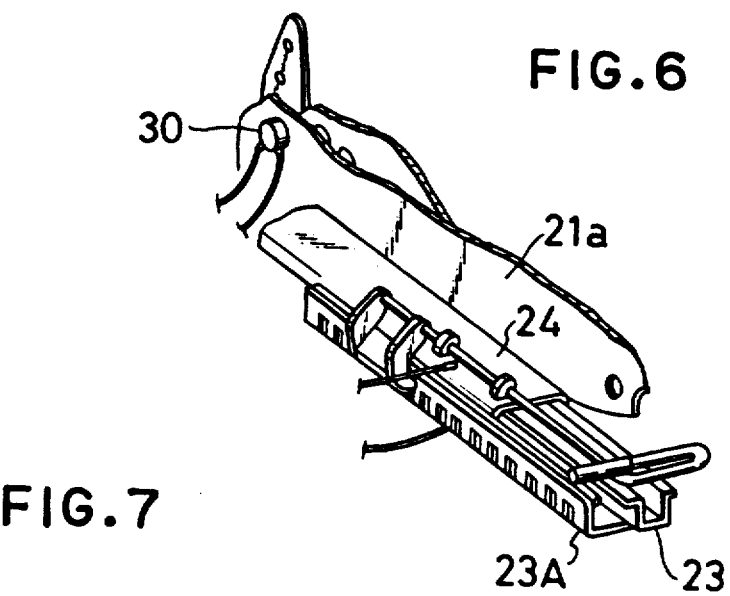
FIG. 6 is a perspective view showing a lower portion of the seat.
Figure 7:
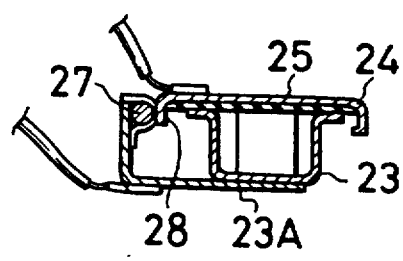
FIG. 7 is a sectional view of the portion shown in FIG. 6.

Now referring to FIG. 5, there is shown a side view of the front portion of the passenger compartment. A seat device 21 is provided with a seat back 21A and a seat cushion 21B. The seat device 21 is provided with an upper rail 24 joined to a seat frame 21a of the seat cushion 21B as shown in FIG. 6. The upper rail 24 is brought into a slidable engagement with a lower rail 23 mounted on a floor panel 22. Thus, the seat device 21 is slidable by a certain distance (200 mm in the illustrated embodiment) in a longitudinal direction of the automobile relative to the floor panel 22 so as to adjust a longitudinal position thereof. The seat device 21 is provided with a position sensor 20 for detecting the longitudinal position thereof. The position sensor 20 is of a slide type rheostat and comprises an insulator 25 for electrically insulating between the upper rail 24 and the lower rail 23, a resistance 27 mounted on a base member 23A of the lower rail 23 and a contact member 28 provided on the upper rail 24 which is kept in contact with the resistance 27 as shown in FIG. 7. When the seat device 21 moves on the rail 23 with the resistance 27 contacting with the contact member 28, a resistance value between them changes. Thus, an amount of the slidable movement of the seat device 21 on the rail 23 can be known by detecting the resistance value in the sensor 20.

A reclining angle sensor 30 is mounted on a rotation shaft 31a of the reclining mechanism 31 provided at a corner portion between the seat back 21A and a seat cushion 21B for detecting a reclining angle of the seat back 21A. The reclining angle sensor 30 is of a rotatable type rheostat. As the seat back 21A moves to change the reclining angle, a resistance value of the rheostat in the reclining mechanism 21 changes. Thus, the change in the reclining angle can be known by detecting a resistance value in the sensor 30.

Figure 8:
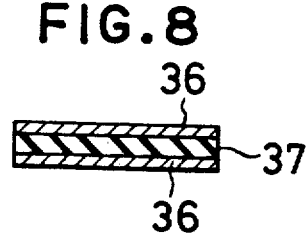
FIG. 8 is a sectional view of a pressure sensor employed for the present invention.

Both the seat back 21A and the seat cushion 21B is provided with a plurality of pressure sensors 35 in a spaced relationship with each other which detects a pressure acting thereon. In the illustrated embodiment, the seat back 21A is provided with five sets of sensors 35 therein. The seat cushion 21B is provided with four sets of the sensors 35 therein. The pressure sensor 35 comprises a pair of electrical conductors 36, 36 such as an aluminum alloy, constituting opposite surface layers and electrical insulator 37 such as a resilient synthetic resin, intervening the conductors 36 as shown in FIG. 8. When a pressure is applied on the sensor 35, the intervening layer 37 of the resilient resin is deformed to change a distance between the two surface conductive layers 36, 36 so that an electrostatic capacity of the sensor 35 changes. Thus, a change in a pressure acting on the pressure sensor 35 can be known by detecting the change of the electrostatic capacity of the sensor 35. A pressure distribution across the seat device can be known by detecting a change in the pressure acting on respective sensors 35 distributed in the seat device 21. A seating condition of the passenger can be known from the pressure distribution on the seat device. For instance, if a relatively high pressure acts on the seat back 21A, this shows that the passenger leans against the seat back or lies on the seat back 21A. This means that an angle between an upper body portion of the passenger and a vertical line is big. On the other hand, if a pressure acting on the seat cushion is increased, the angle between the upper body portion and the vertical line is small.

A seat belt device 41 is provided for the passenger The seat belt device 41 is provided with a buckle support 41A for supporting a buckle 42 at a tip end, and a seat belt member 41B provided at a tip end thereof with a tongue 43 which is removably engaged with the buckle 42. The seat belt device 41 is provided with a seat belt sensor 40 for detecting whether or not the passenger puts the seat belt device 41 on. The seat belt sensor 40 produces a signal denoting ON of the seat belt device 41 when the tongue 43 is engaged with the buckle 42. There is provided a plurality of thermometers 45 away from a direct sunlight for detecting a room temperature of the passenger compartment.

Figure 9:
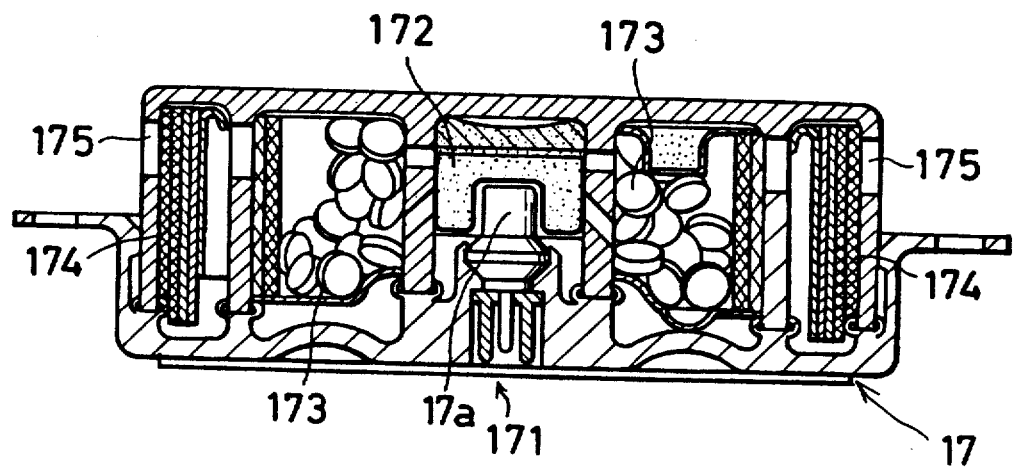
FIG. 9 is a sectional view of an inflater.

As shown in FIG. 9, the inflater 17 is provided with a collision detecting section 171 including the heater 17a, an explosive section 172 including the explosive, a gas generating section 173 which produces a gas such as nitrogen gas in response to the explosion in the explosive section 172. The gas generated in the gas generating section 173 is introduced into the air bag 18 through gas discharging section 174 including gas passages 175.

Figure 10:
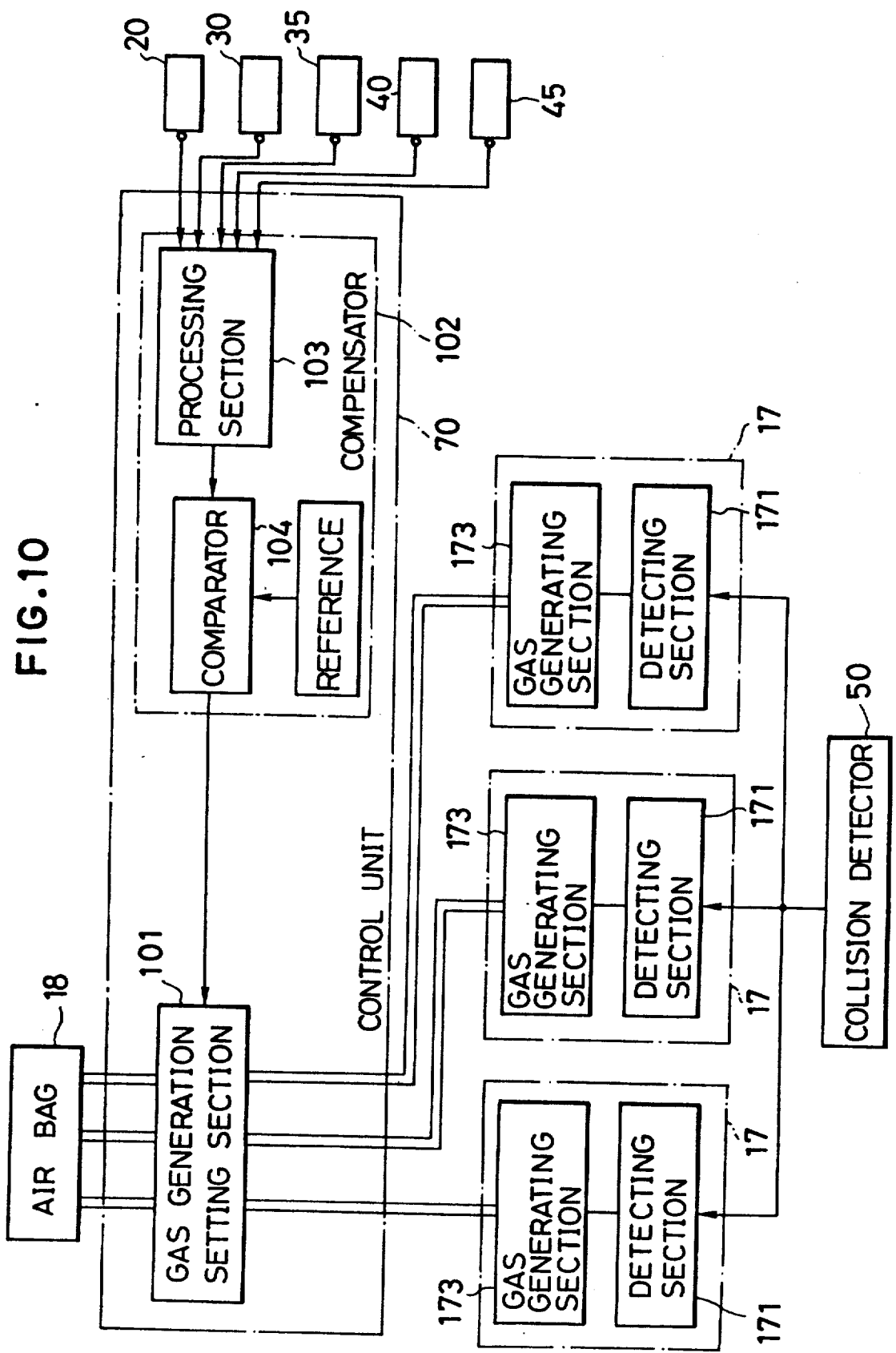
FIG. 10 is a block diagram showing of a control unit.

The control unit 70 is provided with a gas generation setting section 101 for determining the number of the inflaters 17 to be actuated for thereby controlling an amount and pressure of a gas to be supplied for the air bag 18, and a compensator 102 for providing the gas generation setting section 101 with a signal for compensating the amount of the gas to be supplied for the air bag 18 as shown in FIG. 10. The compensator 102 comprises a processing section 103 for receiving signals from the position sensor 20, the reclining angle sensor 30, the pressure sensors 35, the seat belt sensor 40 and the thermometers 45, and a comparator 104 for comparing a signal from the processing section 103 with the reference to produce a resultant signal to be introduced into the gas generation setting section.

The compensator 102 carries out a compensation based on for instance, control properties illustrated in the form of maps as shown in FIGS. 12 through 15. In compensating the gas supply control, there is a priority order wherein the signals from the position sensor 20, seat belt sensor 40, the reclining angle sensor 30, the pressure sensors 35 and the thermometers 45 are considered in this order.

The collision detecting sensor 50 is provided with a plurality of front sensors (two front sensors 51, 52 in the illustrated embodiment) mounted on a front end member such as a bumper and a plurality of rear sensors (three rear sensors 53, 54 and 55 in the illustrated embodiment) mounted on a front body member such as a dash board. When at least one of the front sensors 51, 52 and at least one of the rear sensors 53, 54 and 55 detects a collision of the automobile, the inflater 17 is actuated to supply the gas to the air bag 18 so that the passenger is kept away from a front windshield glass 48 and the steering wheel 3.

Figure 11:
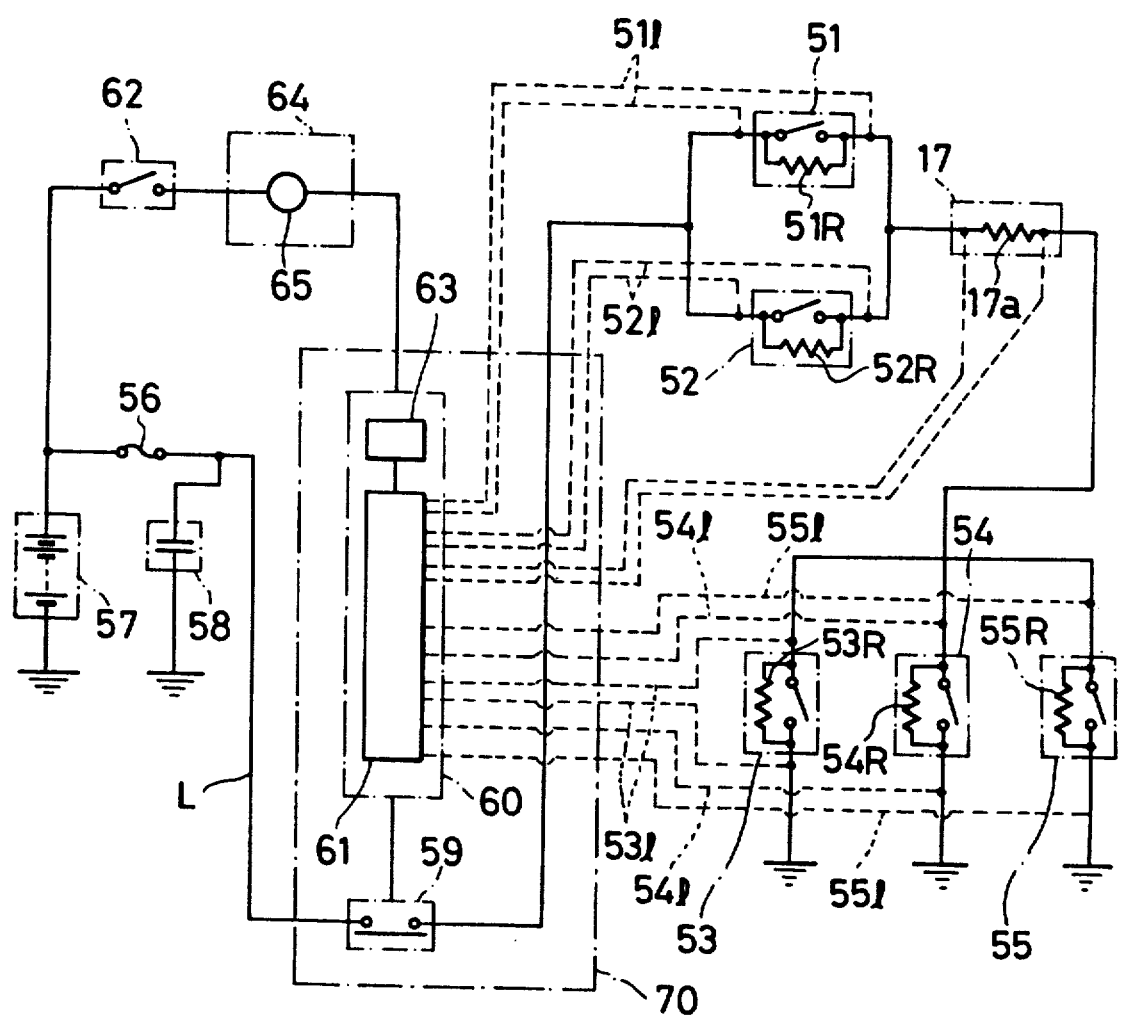
FIG. 11 is a view showing a schematic electric circuit around the control unit.

Hereinafter, there is described an electric circuit of the air bag device taking reference with FIG. 11.

The inflater 17 comprises a heater 17a therein which is connected at one end with one ends of the front sensors 51, 52 in parallel. The front sensors 51, 52 are connected with the control unit 70 at the other ends in parallel. The control unit 70 is connected with a main power supply line L for the air bag device 5. Thus, the heater 17a of the inflater 17 is connected with the main power supply through the control unit 70. The other end of the heater 17a is connected with one ends of the rear sensors 53, 54 and 55 in parallel. The other ends of the rear sensors 53, 54 and 55 are grounded. When at least one of the front sensors 51 and 52 are turned on and at least one of the rear sensors 53, 54 and 55 are turned on, a power is supplied for the heater 17a to heat it so that an explosive such as gunpowder is fired to generate a gas for inflating the air bag 18. This structure of the collision sensor 50 enables to figure out a collision speed of the automobile based on a time difference when more than two among them are actuated. On the main supply line L are provided a protection fuse 56, a power source 57 and a condenser 58 as a back up power source. A system down switch 59, the front sensors 51, 52, the inflater 17 and the rear sensors 53, 54 and 55 are also provided on the main supply line L.

The electric circuit for the air bag device 5 is provided with a failure diagnostic unit 60 including a failure detecting device 61 for detecting a failure of the device 5 and a failure recording device 63. The front sensors 51, 52 and the rear sensors 53, 54 and 55 are connected with the failure detecting device 61 through monitor lines 511, 521, 531 541 and 551 for continually supplying a small current to monitor a circuit. In the case where a change of the current occurs in the sensors 51, 52, 53, 54 and 55, when the failure detecting device 61 detects the change, the system down switch 59 is turned off. The inflator 17 is also connected with the failure detecting device 61 through a monitor line 561 so that a burnout of the heater 17a of the inflater 17 can be detected by the failure detecting device 61. The failure diagnostic unit 60 is connected with an alarm circuit 64 including an alarm device such as a buzzer 65 which is connected with the power source 57 through a manual switch 62. Thus, when the failure diagnostic circuit detects a failure of the air bag device 5, the buzzer 65 is actuated to inform the passenger of the failure.

The sensors 51, 52, 53, 54 and 55 are provided with resistances 51R, 52R, 53R, 54R and 55R respectively. The resistance values thereof are much greater than that of the heater 17a. Therefore, a current in the resistances 51R, 52R, 53R, 54R and 55R can be kept at a small value which is short to fire the explosive.

Figure 12:
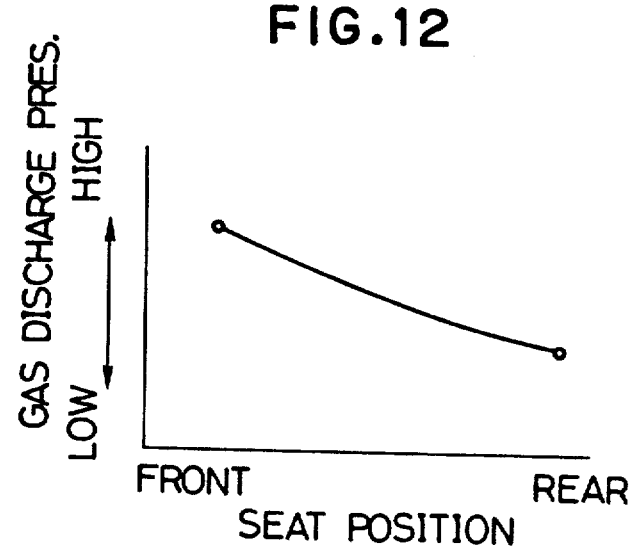
FIG. 12 through FIG. 15 are graphical representations showing a relationship between a seating condition and a gas discharging pressure from the inflater.

In operation, when it is found by means of the position sensor 20 that the seat 21 is located at a forward position, the control unit 70 controls the inflaters 17 to increase an amount of the gas or gas discharging pressure from the inflaters 17 for thereby advancing a timing when the air bag 18 is maximized because a distance between the passenger and the air bag device 5 is reduced. Thus, the air bag device 5 is inflated to contact with the passenger's breast to exert a shock absorbing effect at the optimal timing. The gas discharging pressure from the inflaters 17 is increased to inflate the air bag 18 rapidly as the seat position moves forwardly as shown in FIG. 12.

Figure 13:
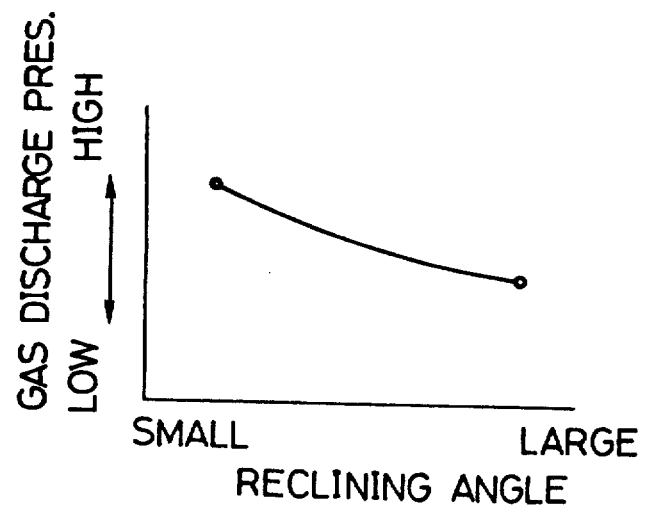

When it is found by the reclining angle sensor 30 that the reclining angle of the seat 21 is relatively small, the control unit 70 controls the inflaters 17 to increase the gas or gas discharging pressure from the inflaters 17 for advancing the timing when the air bag 18 is maximized because the passenger's breast is close to the air bag device 5. As a result, the inflated air bag is brought into contact with the passenger's breast at the optimal timing wherein the shock absorbing effect of the air bag 18 is maximized. The gas discharging pressure from the inflaters 17 is increased to inflate the air bag 18 quickly as the reclining angle of the seat 21 is decreased as shown in FIG. 13.

When the passenger does not put the seat belt device 41 on, the control unit 70 advances the timing of inflation of the air bag 18. This is because the passenger is free to move forwardly in the case where he does not put the seat belt device 41 on reducing the distance to the air bag device 5.

Figure 14:
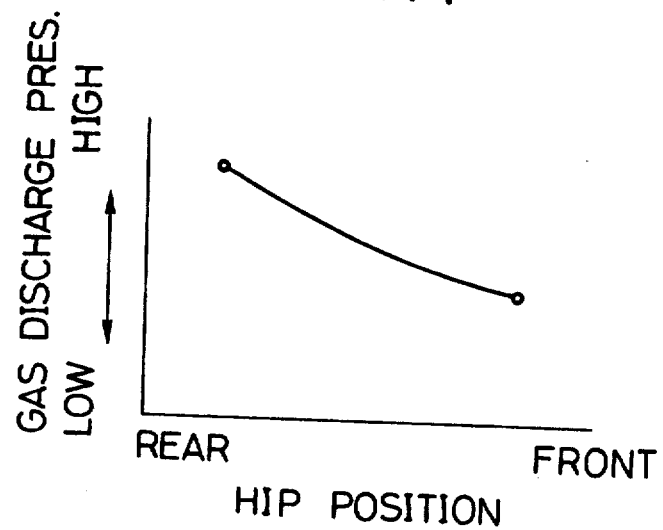
Figure 15:
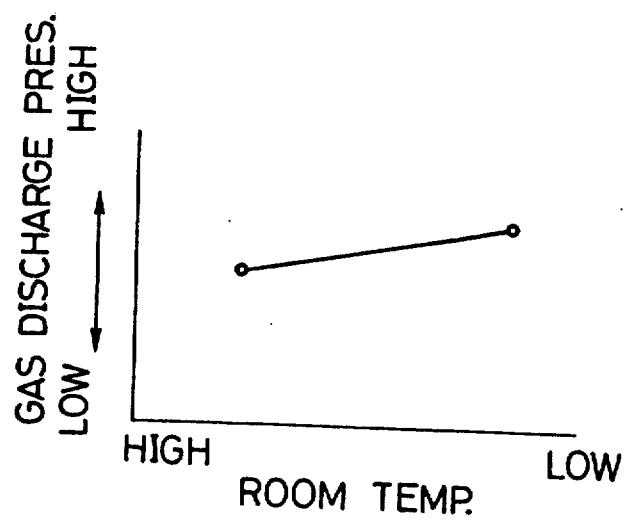

When it is found from the pressure sensors 35 that the passenger takes a posture in which the angle between the upper body portion of the passenger and the vertical line is large in the case where his hip position is in a forward position in the seat 21, the control unit 70 controls the inflaters 17 to retard the timing when the passenger contacts with the air bag device 5 by reducing the gas amount of pressure from the inflaters 17. This is because the breast of the passenger is relatively far away from the air bag device 5 since he leans against the seat back 21B. Thus, the control unit 70 advances the timing of the inflation of the air bag 18 as the hip position of the passenger moves rearwardly as shown in FIG. 14.

When it is found by the thermometers 45 that the room temperature is relatively high, the control unit 70 controls the inflaters 17 to reduce a gas generation therefrom, since it is easy to inflate the air bag 18 because of a low density of air in the passenger compartment. The air bag device 5 can be provided for not only the driver's assistant but also the driver.

In controlling the inflation speed of the air bag 18, a relief valve may be provided on the air bag for relieving the gas in the air bag 18 in accordance with a control signal from the control unit 70.

Figure 16:
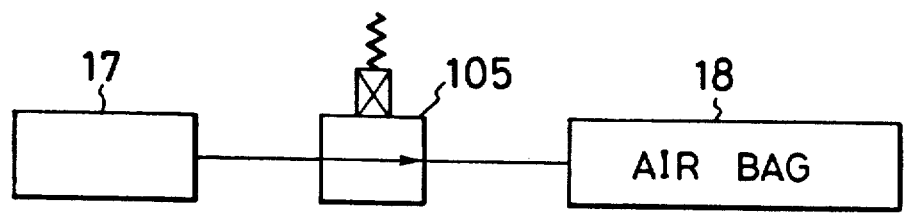
FIG. 16 is a diagrammatical view showing a pressure servo valve in accordance with another embodiment of the present invention.

Referring to FIG. 16, there is shown another embodiment of the gas generation control system of the present invention. In the illustrated gas generation control system, the gas generation setting section 101 controls an opening of a magnetic proportion type pressure servo valve 105 provided between the inflater 17 and the air bag 18 to thereby control an inflation speed of the air bag 18 in accordance with a signal from the compensator 102 and the collision sensor 50. For this purpose, at least one pressure servo valve 105 is provided between the inflater 17 and the air bag 17 with the diaphragm valve 17A or without the diaphragm valve 17A.

Figure 17:
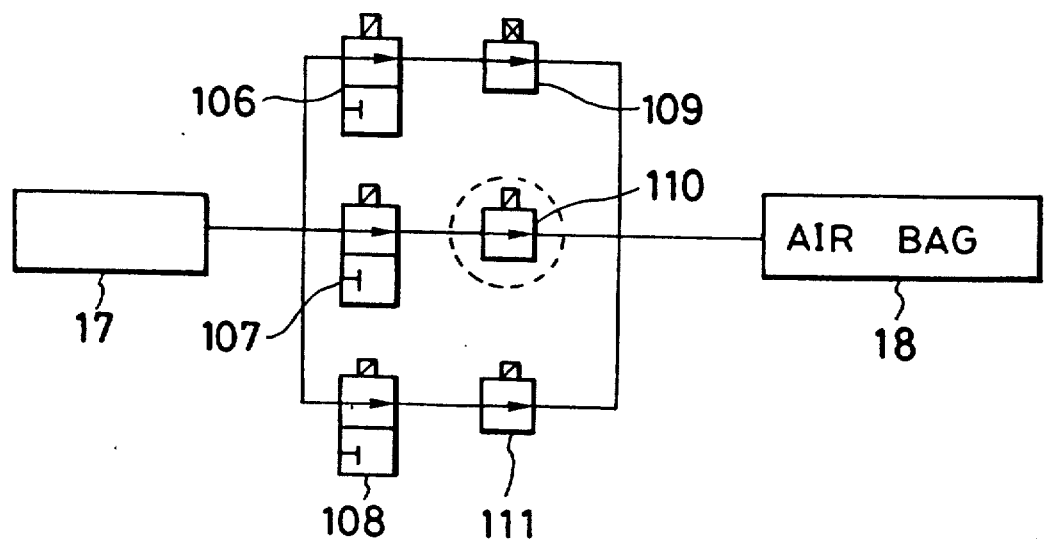
FIG. 17 is a diagrammatical view showing a connection of hydraulic valves and the inflater and the air bag in accordance with still another embodiment of the present invention.
Figure 18:
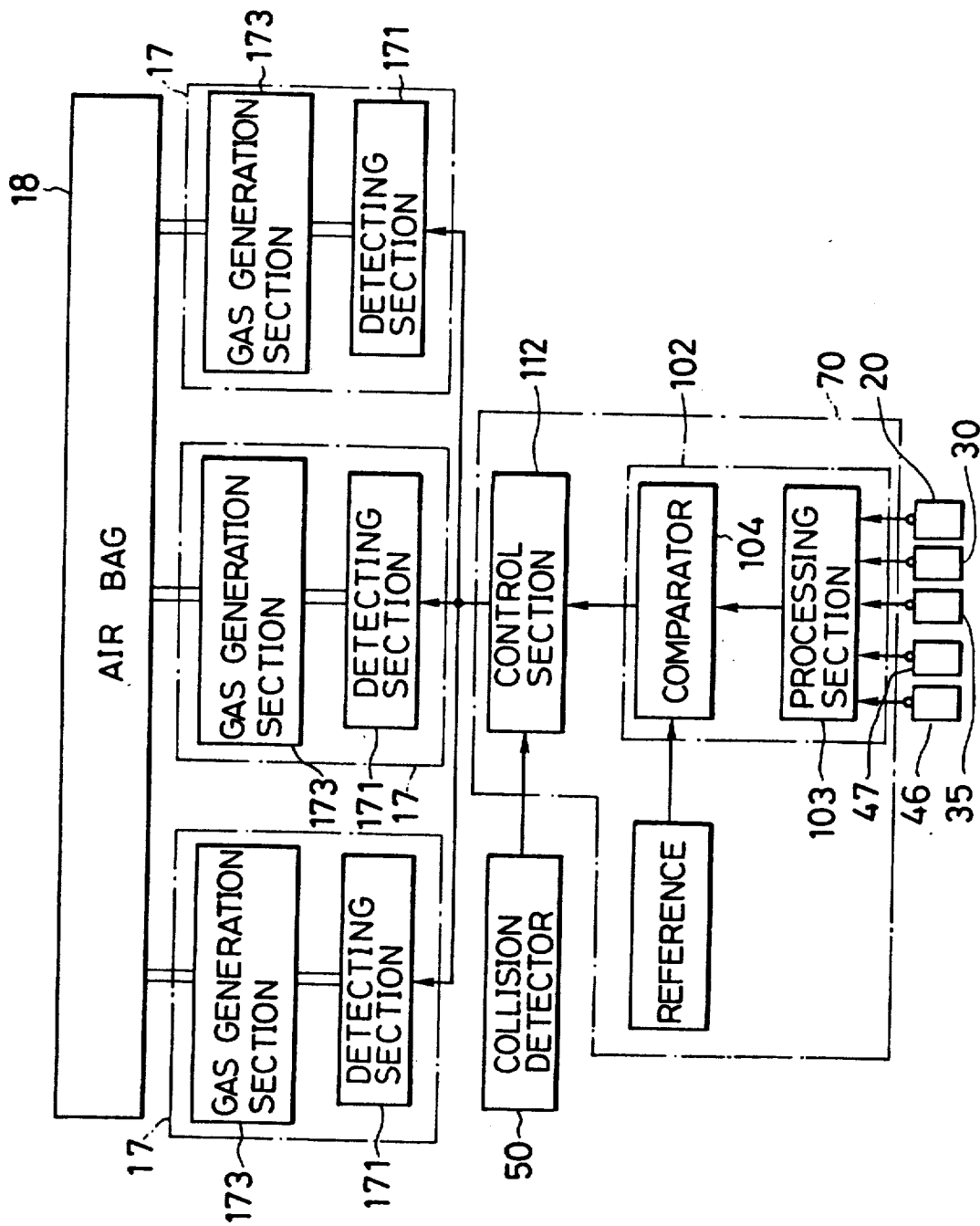
FIG. 18 is a block diagram of a control unit but showing further embodiment of the invention.

Referring to FIG. 17, there is shown still another embodiment of the gas generation control system. In the illustrated gas generation control system, three on-off solenoid valves 106, 107 and 108 in parallel and three pressure setting solenoid valves 109, 110 and 111 in parallel are provided between the inflater 17 and the air bag 18. The on-off valve 106 and pressure setting valve 109, 107 and 110, and 108 and 111 are disposed in serial respectively. Pressure values set by the pressure setting valves 109, 110 and 111 are different. The gas generation setting section 101 controls actuation of the on-off solenoid valves 106, 107 and 108 to communicate the inflater 17 with the air bag 18. Thus, the gas pressure introduced into the air bag 18 can be controlled. It follows that a time period of the inflating operation of the air bag 18 can be controlled. Moreover, this structure enables the gas generation setting section 101 of the control unit 70 to control the timing of initiation in the inflating operation of the air bag 18.

Hereinafter, there is described a further embodiment of the present invention taking reference with FIGS. 18 through 23. In this embodiment, the air bag device 5 is provided with a size sensor 47 for detecting a size of the passenger, specifically detecting a size of the upper body of the passenger. The size sensor 47 is disposed within a room lamp device mounted on a ceiling of the passenger compartment. The size sensor 47 is of a ultrasonic sounding device which produces an ultrasonic wave and catches the reflected wave to detect a height of the passenger on 10 the seat 21. The air bag device 5 is also provided with a collision speed sensor 46 for detecting a speed of an object moving toward the automobile in a relative situation taking advantage of the Doppler effect so that a magnitude of the collision can be evaluated. The collision speed sensor 46 is mounted on the front bumper of the automobile. The control unit 70 receives signals from various sensors including the position sensor 20, the reclining angle sensor 30, the pressure sensors 35, the collision speed sensor 46 and the size sensor as well as the former embodiment. The processing section 103 processes signals from the sensors and provides the comparator 104 with a resultant output. The comparator 104 receives the signal from the processing section 103 and compares the signal with the reference to produce a compensating signal for compensating a control signal of the inflater 17. The control unit 70 is provided with a control section 112 for determining a timing of the actuation of the detecting section 171 of the inflater 17. In the case where the air bag device 5 is provided with a plurality of the inflaters 17, the respective inflaters 17 can be actuated at the different timings for controlling the gas discharging pressure for the air bag 18. In compensating the gas supply control, there is a priority order wherein the signals from the collision speed sensor 46, the reclining angle sensor 30, the pressure sensors 35 and the size sensor 47 are taken into account in this order.

Figure 19:
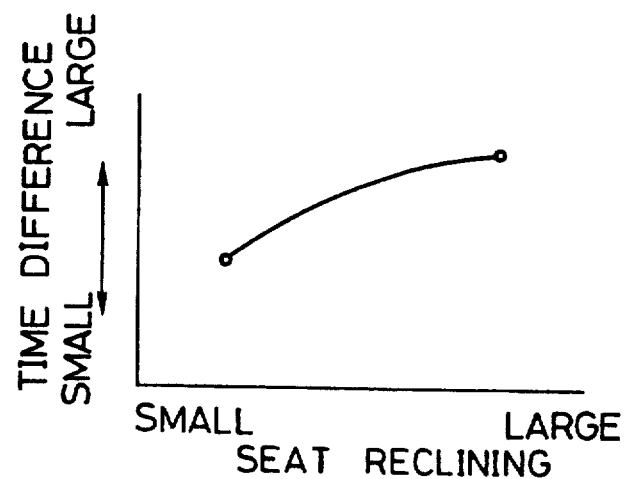
FIG. 19 through FIG. 22 are graphical representations showing a relationship between time difference to actuation of the inflater and the seating condition of the passenger in the embodiment of FIG. 18.

In operation of the illustrated embodiment, when it is found by the reclining angle sensor 30 that the reclining angle of the seat 21 is relatively small, the control unit 70 reduces a time period between the collision and the actuation of the inflater 17. In other words, the control unit 70 controls the inflater 17 to inflate the air bag quickly because the passenger's breast is close to the air bag device 5. In this connection, the timing of the collision is a time when at least one of the sensors 51, 52, 53, 54 and 55 is actuated. And the timing of the actuation of the inflater 17 is a time when an actuating signal is introduced into the detecting section 171 of the inflater from the control unit 70. It follows that the inflated air bag is brought into contact with the passenger's breast at the optimal timing wherein the shock absorbing effect of the air bag 18 is maximized. The time difference between the collision and the actuation of the inflater 17 is reduced as the reclining angle of the seat 21 is increased as shown in FIG. 19.

Figure 20:
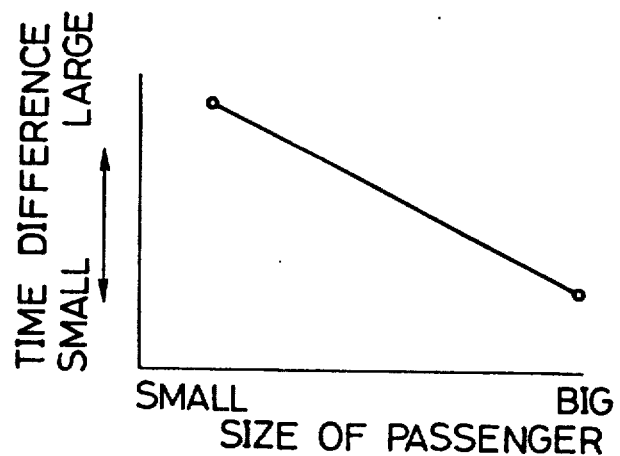

The control unit 70 reduces the time difference between the collision and the actuation of the inflater 17 based on the signal from the size sensor 47 in the case where the passenger is big as shown in FIG. 20.

Figure 21:
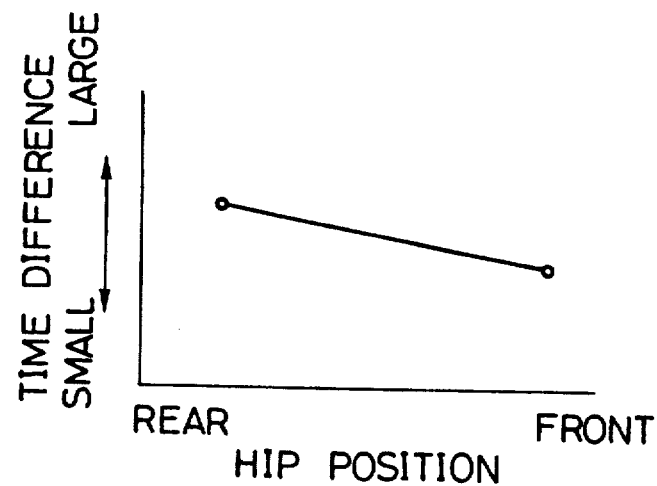

When it is found from the pressure sensors 35 that the passenger takes a posture in which the angle between the upper body portion of the passenger and the vertical line is large in the case where his hip position is in a forward position in the seat 21, the control unit 70 compensate the control signal to the inflater 17 in a manner that the time difference between the collision and the actuation of the inflater 17 is reduced as the hip position of the passenger moves forwardly as shown in FIG. 21.

Figure 22:
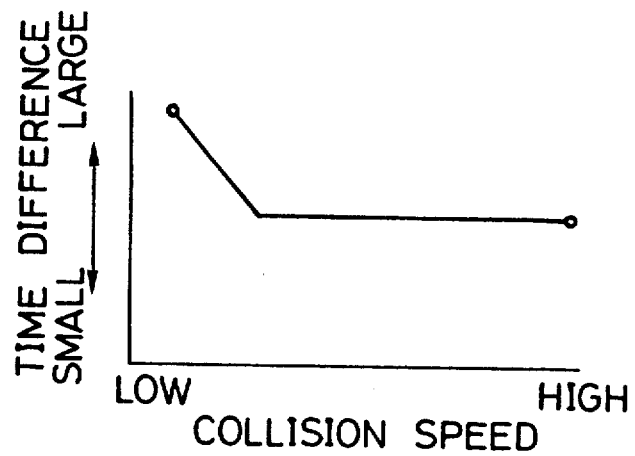

When it is found through the collision speed sensor 46 that the collision speed is high and thus the magnitude of the collision is considered great, the control unit 70 compensates the output signal to reduce the time difference between the collision and the actuation of the inflater 17 as shown in FIG. 22.

Hereinafter, there is described a further embodiment of the present invention taking reference with FIG. 23 through FIG. 35.

Figure 23:
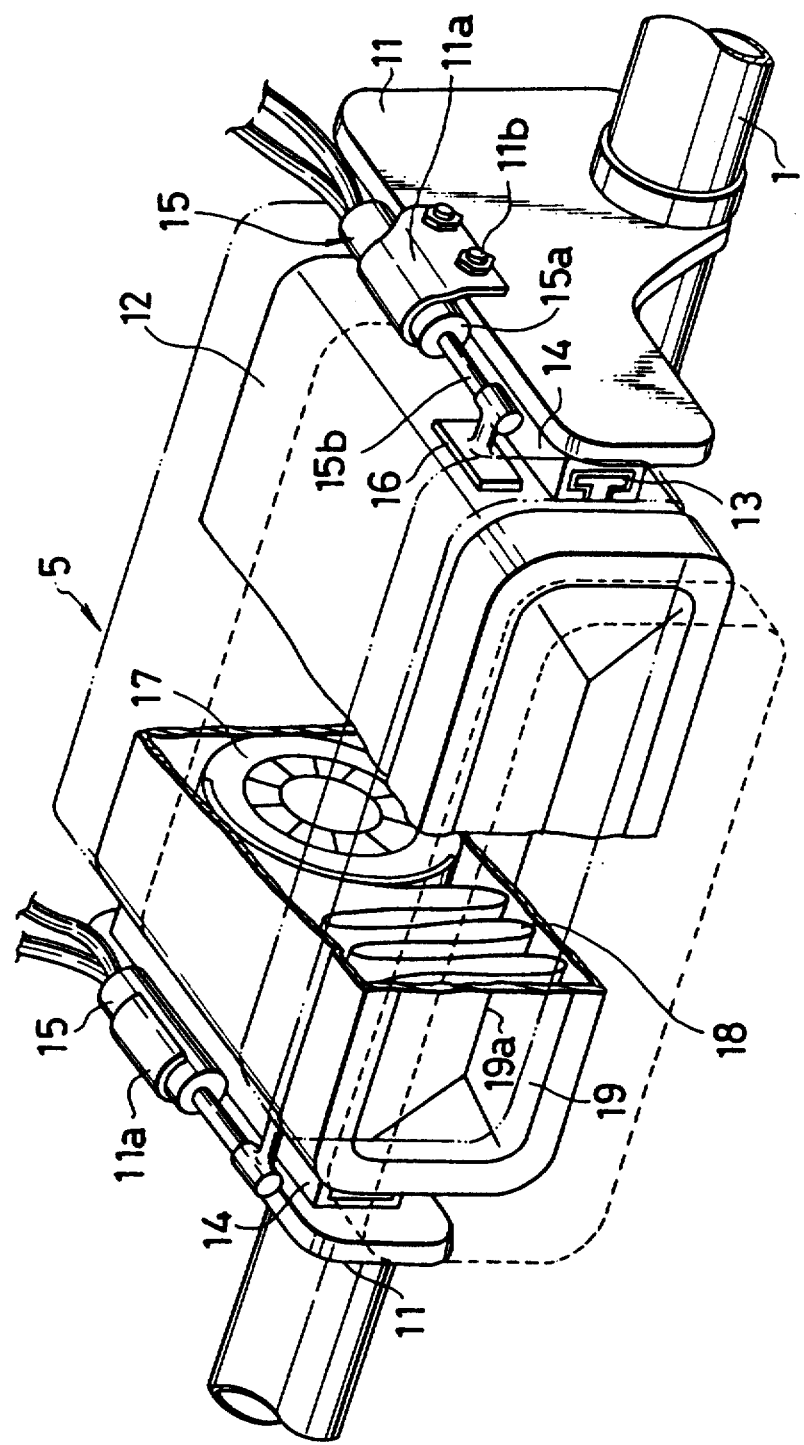
FIG. 23 is a perspective view showing an air bag system in accordance with further embodiment of the present invention.

Referring to FIG. 23, the air bag device 5 is movably carried in the longitudinal direction of the automobile by the brackets 11, 11 at opposite sides. The brackets 11, 11 are rigidly mounted on the steering support member 1. A pair of slide rails 13, 13 of T-shaped configuration in section is mounted on opposite sides of the casing 12. The slide rails 14, 14 are slidably engaged with a pair of rail guides fixed to the brackets 11, respectively. There are provided a pair of hydraulic cylinder devices 15, 15 of which main bodies 15a, 15a are secured to the brackets 11, 11 through support members 11a, 11a, and bolts 11b, 11b. A piston rod 15b of each of the cylinder device 15 extending in parallel with the rail 13 is connected with the casing 12 at the tip end through a joint 16 above the rail 13 so that the air bag device 5 can move along the rail guides 14, 14 in accordance with an operation of the cylinder device 15.

Figure 24:
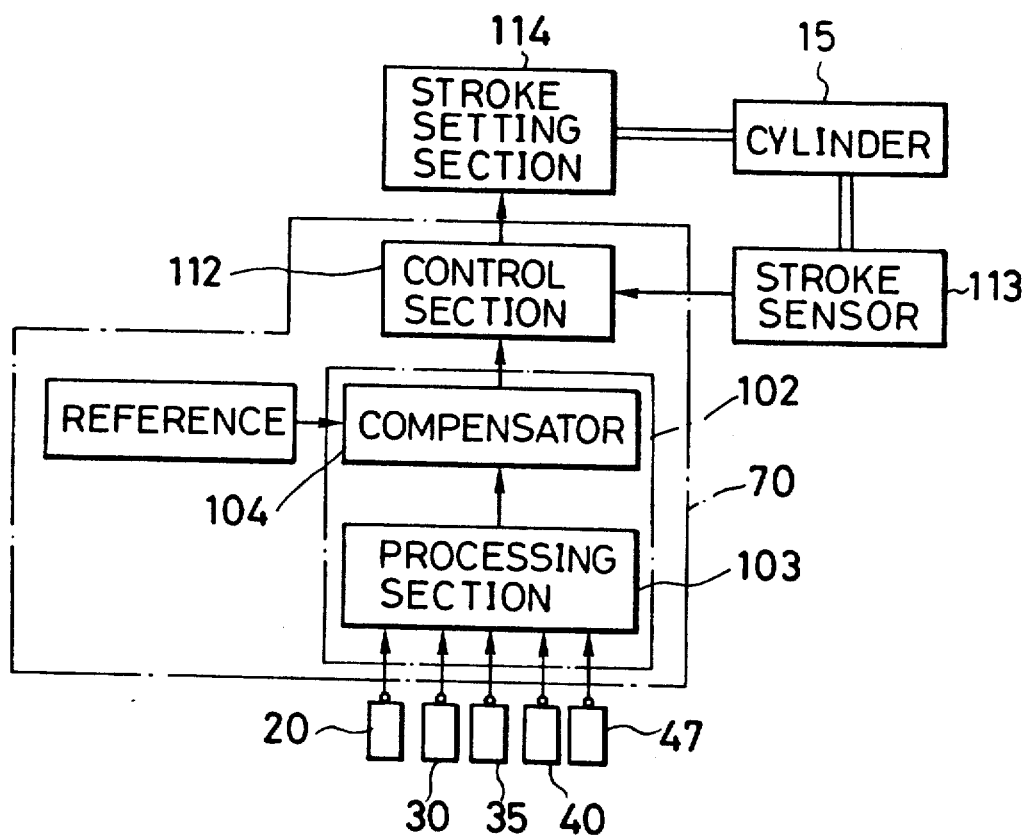
FIG. 24 is a block diagram of a control unit in accordance with the embodiment of FIG. 23.
Figure 25:
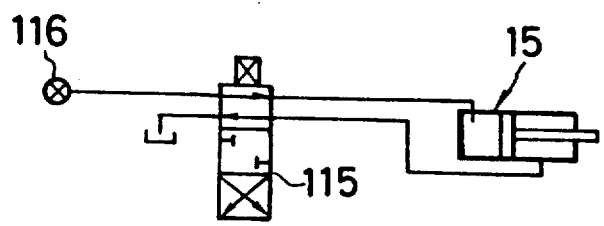
FIG. 25 is a diagrammatical view showing a pressure servo valve for controlling an operation of a cylinder employed for the embodiment of FIG. 23.

As shown in FIG. 24, the control unit 70 receives signals from various sensors including the position sensor 20, the reclining angle sensor 30, the pressure sensors 35, the seat belt sensor 40 and the size sensor 47. The processing section 103 processes signals from the sensors and provides the comparator 104 with a resultant output. The comparator 104 receives the signal from the processing section 103 and compares the signal with the reference to produce a compensating signal for compensating a control signal of the inflater 17. The control unit 70 is provided with a control section 112 for receiving a signal from a stroke sensor 113 which detects a stroke of the piston rod 15b of the cylinder device 15 and producing a control signal to a stroke setting section 114 which controls the stroke of the cylinder device 15 in light of the output of the compensator 102. Thus, the distance between the passenger and the air bag device 5 is optimized in accordance with the seating condition of the passenger. Typically, the stroke setting section 114 is constituted by a magnetic proportion type pressure servo valve 115 as shown in FIG. 25 the pressure servo valve 115 is connected to respective oil chambers of the cylinder device 15 at one hand and connected with a hydraulic power source 116 and is controlled by a signal from the control unit 70 to maintain the stroke of the cylinder device 15 at a predetermined value by controlling a quantity of oil passing therethrough.

Figure 26:
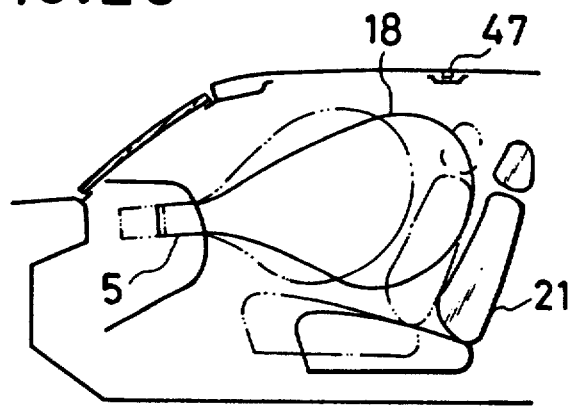
FIG. 26 is a schematic side view showing a relationship between a seat position and a longitudinal position of the air bag system.
Figure 27:
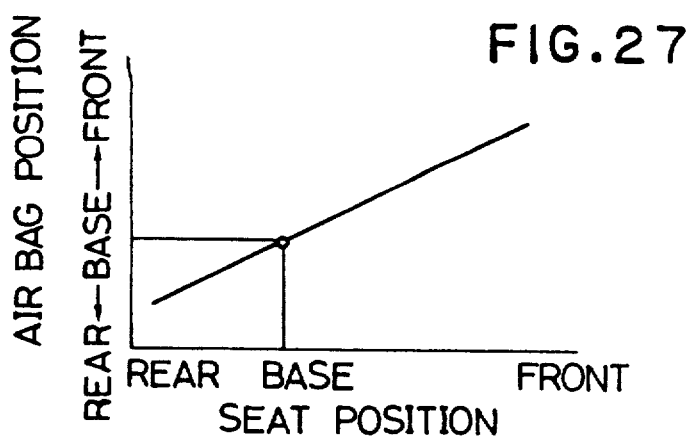
FIG. 27 is a graphical representation showing a relationship between the seat position and the longitudinal position of the air bag system.

According to the illustrated embodiment, the air bag device 5 is moved rearwardly as shown in FIG. 26 from a position of a chain line to a position of a real line when the seat position is moved rearwardly from a position of a chain line to a position of a real line in FIG. 26 so that the distance between the air bag device 5 and the passenger can be maintained at a substantially constant value. Accordingly, the position of the air bag 5 is controlled to compensate an offset from a base position of the seat 21 as shown in FIG. 27. That is, the movement of the air bag device 5 is increased as the amount of the offset from the base position of the seat 21 is increased.

Figure 28:
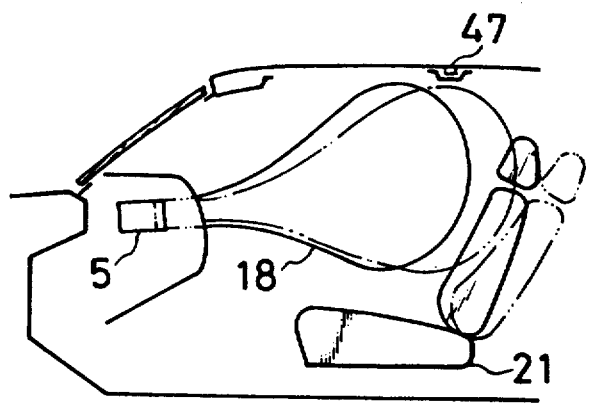
FIG. 28 is a schematic side view showing a relationship between a reclining angle and the longitudinal position of the air bag system.
Figure 29:
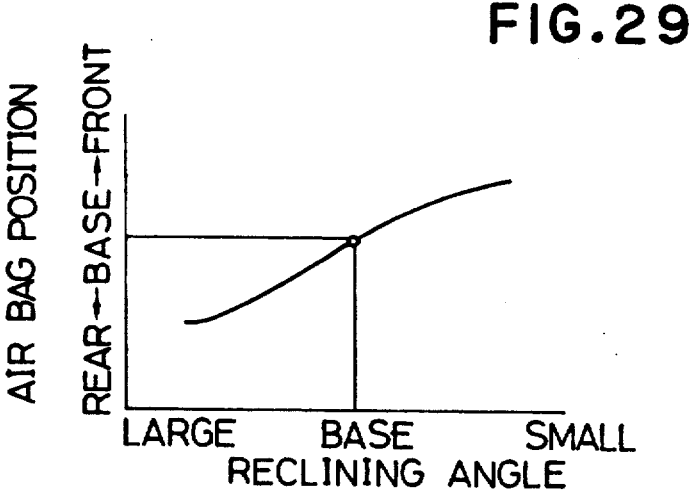
FIG. 29 is a graphical representation showing a relationship between the reclining angle and the longitudinal position of the air bag system.

When the seat back 21B is swung to increase the reclining angle of the seat 21 from a position of a chain line to a real line as shown in FIG. 28, the control unit 70 controls the pressure servo valve 115 to move the air bag 5 rearwardly from a position of a chain line to a position of real line in FIG. 28 to keep the distance between the air bag device 5 and the passenger's breast at a constant value. As shown in FIG. 29, the air bag device 5 is moved rearwardly as the reclining angle is increased. It follows that the inflated air bag is brought into contact with the passenger's breast at the optimal timing irrespective of a change in the reclining angle.

Figure 30:
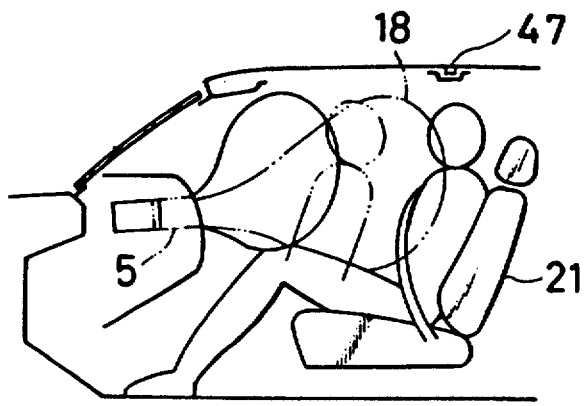
FIG. 30 is a schematic side view showing a relationship between a condition as to whether the passenger wears a seat belt or not and the longitudinal position of the air bag system.

When the passenger puts the seat belt device 41 on, the control unit 70 positions the air bag device 5 at a forward position as shown by a real line in FIG. 30. On the other hand, when the passenger does not put the seat belt on, the control unit 70 positions the air bag device 5 at a rearward position as shown by a chain line in FIG. 30.

Figure 32:
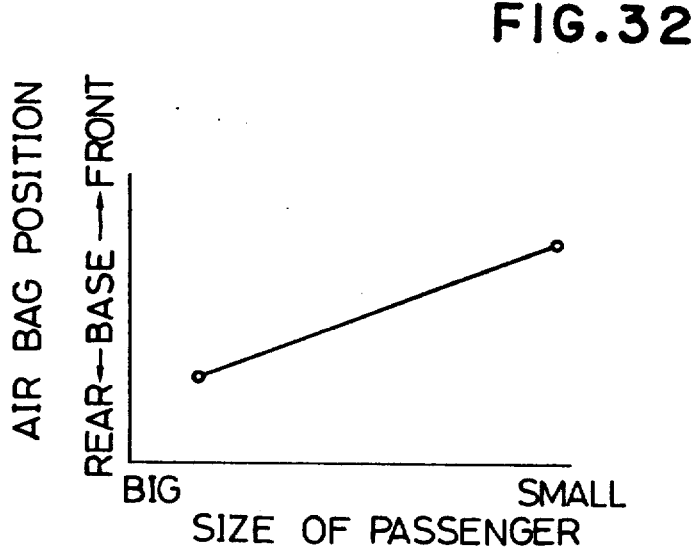
FIG. 32 is a graphical representation showing a relationship between the size of the passenger and the longitudinal position of the air bag system.
Figure 31:
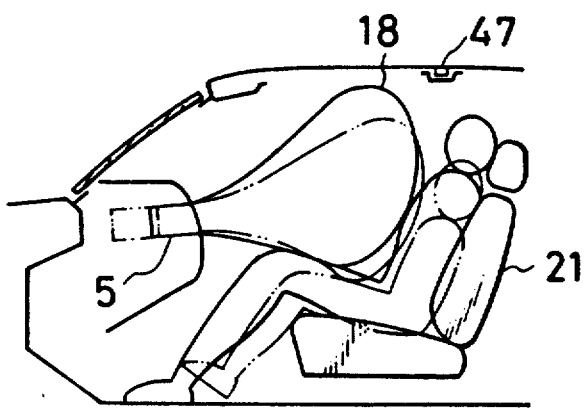
FIG. 31 is a schematic side view showing a relationship between a size of the passenger and the longitudinal position of the air bag system.

The control unit 70 controls the cylinder 15 to position the air bag device 5 at a rearward position as shown by a real line in FIG. 31 when the passenger is big in size such as adult in view of the signal from the size sensor 47. To the contrary, the control unit 70 positions the air bag device 5 at a relatively forward position as shown by a chain line in FIG. 31 when the passenger is small such as a child. As shown in FIG. 32, the control unit 70 controls the longitudinal position of the air bag device 5 in accordance with the size of the passenger to keep the distance between the passenger and the air bag device constant.

Figure 33:
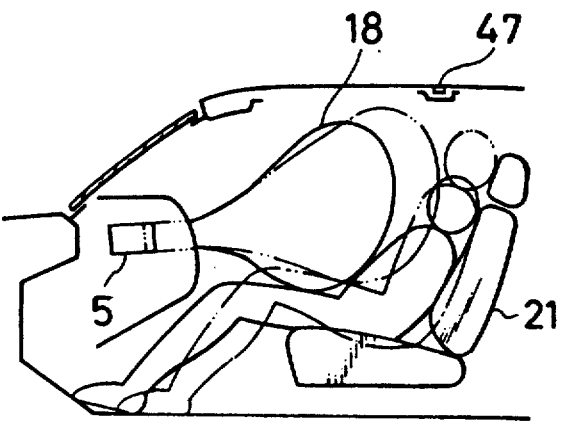
FIG. 33 is a schematic side view showing a relationship between a hip position of the passenger and the longitudinal position of the air bag system.
Figure 34:
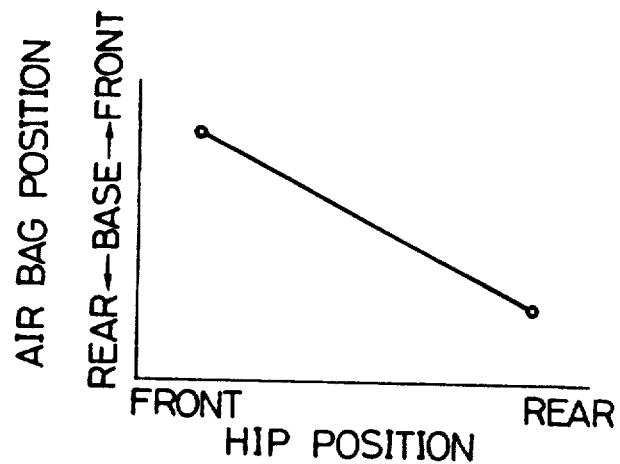
FIG. 34 is a graphical representation showing a relationship between the hip position of the passenger and the longitudinal position of the air bag system.

When the passenger takes a posture leaning against the seat back 21B, namely when his hip position is in a forward position in the seat cushion 21A, the control unit 70 positions the air bag device 5 at a forward position as shown by a real line in FIG. 33. Contrarily, the control unit 70 positions the air bag device 5 rearwardly as shown by a chain line in FIG. 33 when the passenger takes a relatively upright posture as shown by a chain line in FIG. 33. As shown in FIG. 34, the control unit 70 controls the position of the air bag device 5 in accordance with the posture or the hip position in a manner that the air bag device is moved forwardly as the hip position of the passenger is moved forwardly. It follows that the inflated air bag is brought into contact with the passenger's breast at the optimal timing irrespective of the posture of the passenger.

Preferably, the control of the air bag position is made based on a combination of two or more factors as aforementioned.

Figure 35:
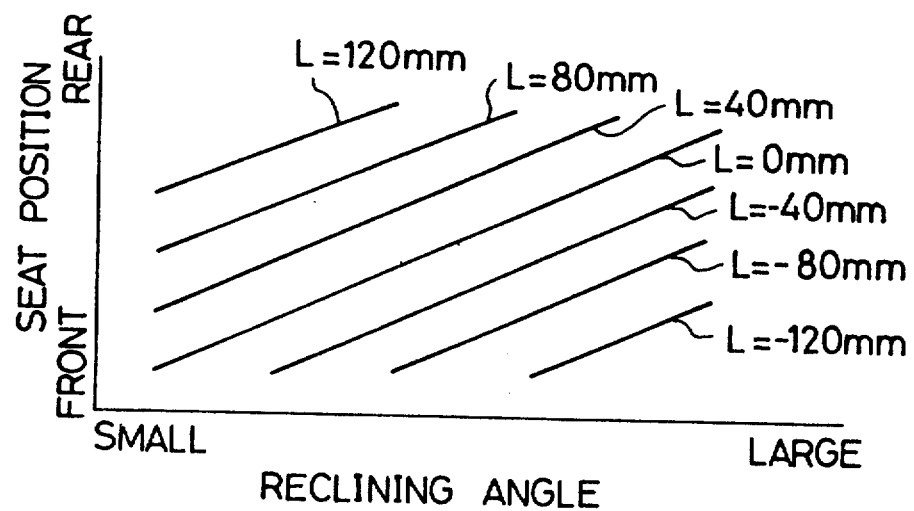
FIG. 35 is a graphical representation showing a relationship among the seat position, the reclining angle and the longitudinal position of the air bag system.

For instance, where the control is made in accordance with both the seat position and the reclining angle of the seat 21, the movement L of the air bag device 5 from the base position can be illustrated as shown in FIG. 35.

Hereinafter, there is described a further embodiment of the present invention taking reference with FIG. 36 through FIG. 48.

Figure 36:
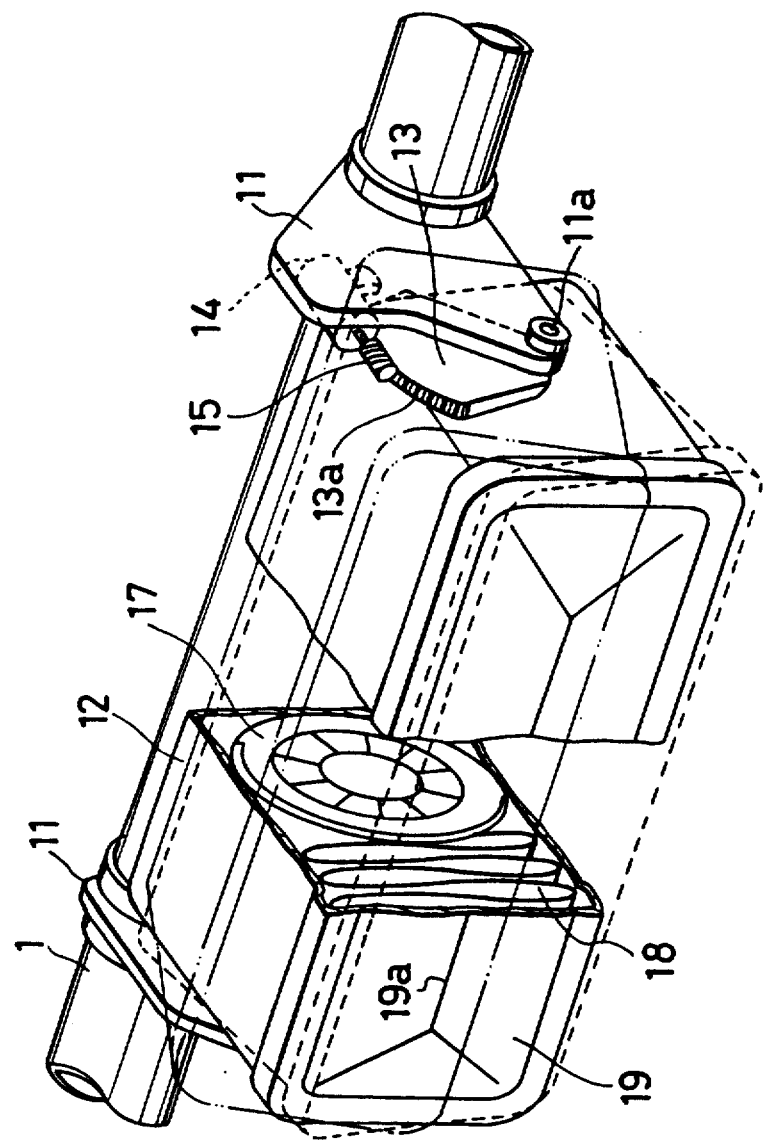
FIG. 36 is a perspective view showing an air bag system in accordance with yet further embodiment of the present invention.

Referring to FIG. 36, the air bag device 5 is carried by the brackets 11, 11 at opposite sides through pivot pins 11a, 11a for a swingable movement about the pivot pins 11a, 11a. The brackets 11, 11 are rigidly mounted on the steering support member 1. A sector gear 13 formed with a gear portion 13a is mounted on one side of the casing 12. A servo motor 14 provided with a worm gear 15 is mounted on one of the brackets 11, 11. The worm gear 15 is adapted to be engaged with the gear portion 13a of the sector gear. The servo motor 14 is controlled by a control signal from the control unit 70 to provide the air bag device 5 with an optimal angular position for the passenger in accordance with the seating condition of the passenger.

Figure 37:
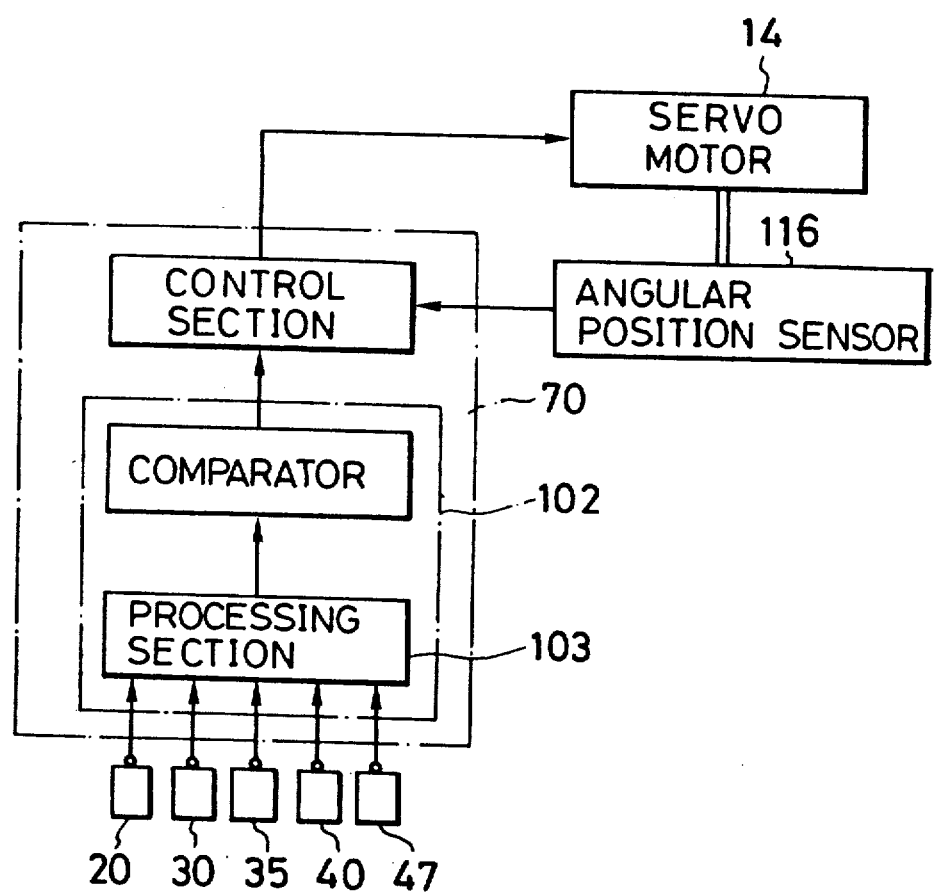
FIG. 37 is a block diagram of a control unit in accordance with the embodiment of FIG. 36.

As shown in FIG. 37, the control unit 70 receives signals from various sensors including the position sensor 20, the reclining angle sensor 30, the pressure sensors 35, the seat belt sensor 40 and the size sensor 47. The processing section 103 processes signals from the sensors and provides the comparator 104 with a resultant output. The comparator 104 receives the signal from the processing section 103 and compares the signal with the reference to produce a compensating signal for compensating a control signal of the inflater 17. The control unit 70 is provided with a control section 112 for receiving a signal from an angular position sensor 116 which detects an angular position of the air bag device 5 and producing a control signal to the servo motor 14 in accordance with the output of the compensator 102. Thus, the orientation of the air bag device 5 to the passenger is optimized in accordance with the seating condition of the passenger.

Figure 38:
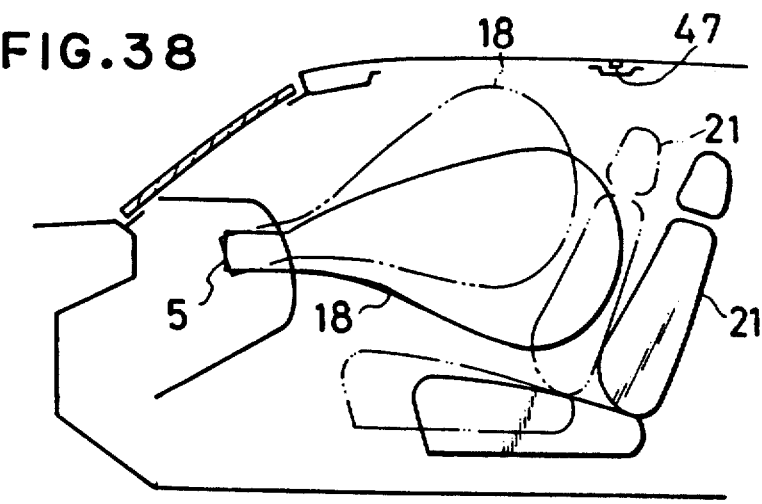
FIG. 38 is a schematic side view showing a relationship between a seat position and an angular position of the air bag system about a horizontal swinging axis.
Figure 39:
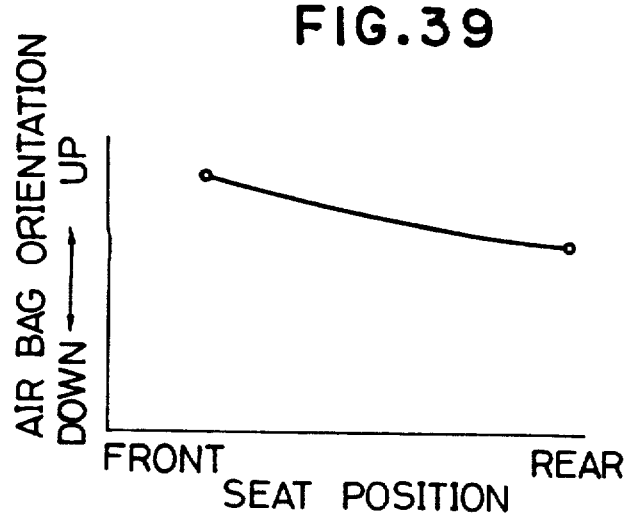
FIG. 39 is a graphical representation showing a relationship between the seat position and the angular position of the air bag system.

According to the illustrated embodiment, the air bag device 5 is swung to orient upwardly as shown by a chain line in FIG. 38 from a base position shown by a real line when the seat position is moved forwardly as shown by a chain line from a base position shown by a real line. This is because the seat 21 is moved slightly upwardly as well when moved forwardly. Accordingly, the air bag 5 is swung upwardly as the seat is moved forwardly as shown in FIG. 39.

Figure 40:
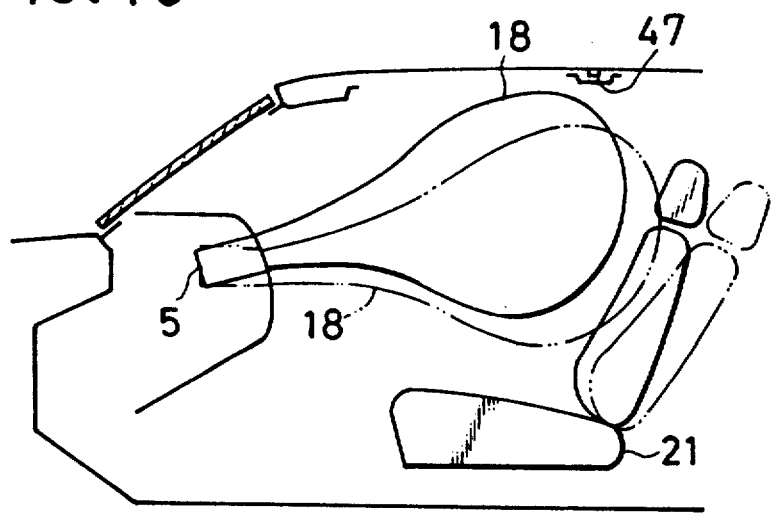
FIG. 40 is a schematic side view showing a relationship between the reclining angle and the angular position of the air bag system.
Figure 41:
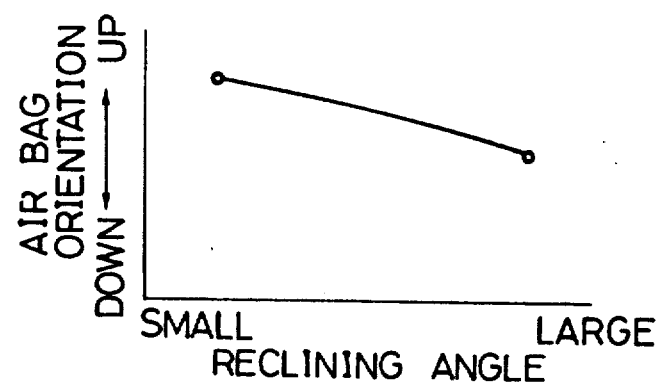
FIG. 41 is a graphical representation showing a relationship between the reclining angle and the angular position of the air bag system.

When the seat back 21B is swung to increase the reclining angle of the seat 21 from a position of a real line to a chain line as shown in FIG. 40, the control unit 70 controls the servo motor 14 to swing the air bag 5 downwardly from a position of a real line to a position of chain so that the air bag device 5 contacts with the passenger's breast when inflated. As shown in FIG. 41, the air bag device 5 is swung downwardly as the reclining angle is increased. It follows that the inflated air bag is brought into contact with the passenger's breast at the optimal timing irrespective of a change in the reclining angle.

Figure 42:
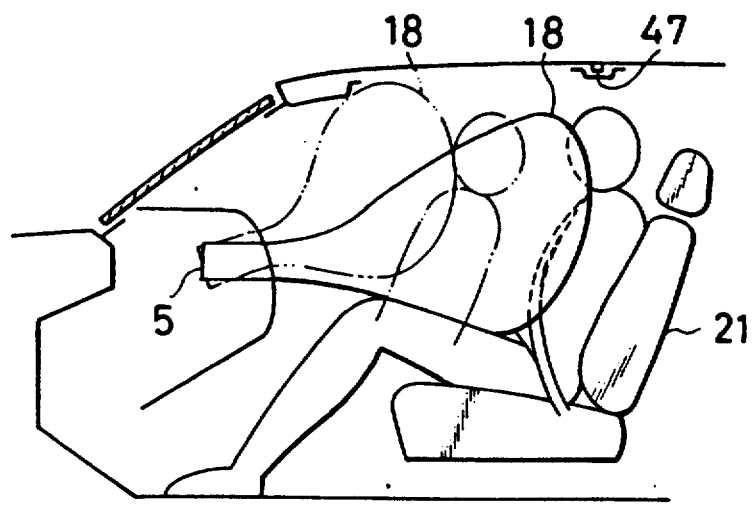
FIG. 42 is a schematic side view showing a relationship between the condition as to whether the passenger wears a seat belt or not and the angular position of the air bag system.

When the passenger puts the seat belt device 41 on, the control unit 70 controls the servo motor 14 to keep the air bag device 5 at a base angular position as shown by a real line in FIG. 42. On the other hand, when the passenger does not put the seat belt on, the control unit 70 urges the servo motor 14 to swing the air bag device 5 upwardly to an angular position as shown by a chain line.

Figure 44:
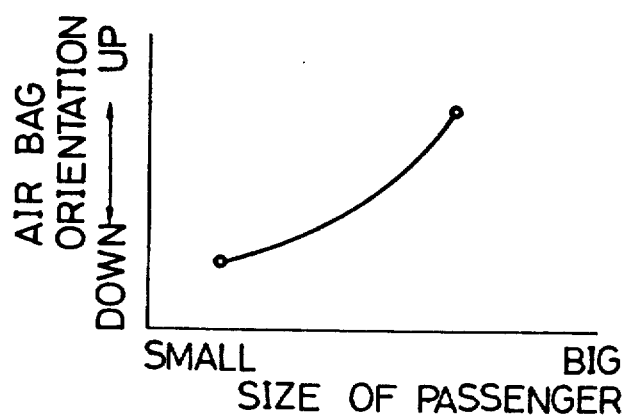
FIG. 44 is a graphical representation showing a relationship between the size of the passenger and the angular position of the air bag system.
Figure 43:
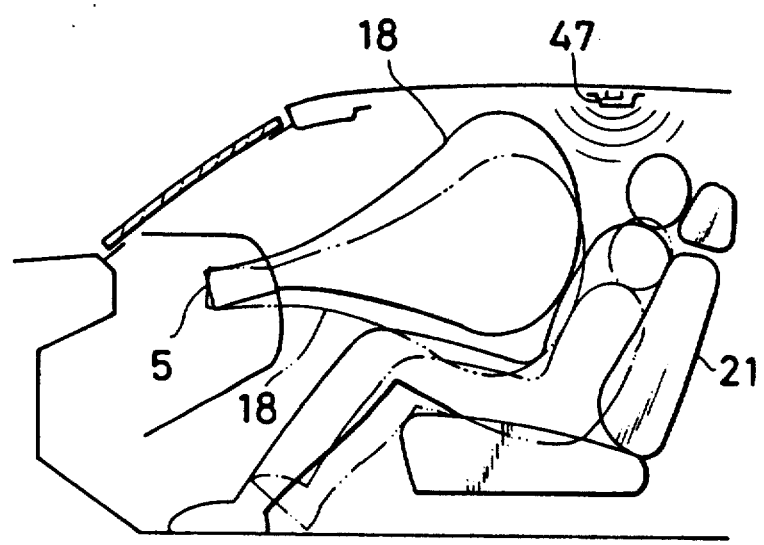
FIG. 43 is a schematic side view showing a relationship between the size of the passenger and the angular position of the air bag system.

The control unit 70 controls the servo motor 14 to orient the air bag device 5 relatively upwardly as shown by a real line in FIG. 43 when the passenger is big in size such as adult in view of the signal from the size sensor 47. To the contrary, the control unit 70 positions the air bag device 5 to orient relatively downwardly as shown by a chain line when the passenger is small such as a child. As shown in FIG. 44, the control unit 70 controls the air bag device 5 to orient upwardly as the passenger is big in size to keep the distance between the passenger and the air bag device constant.

Figure 45:
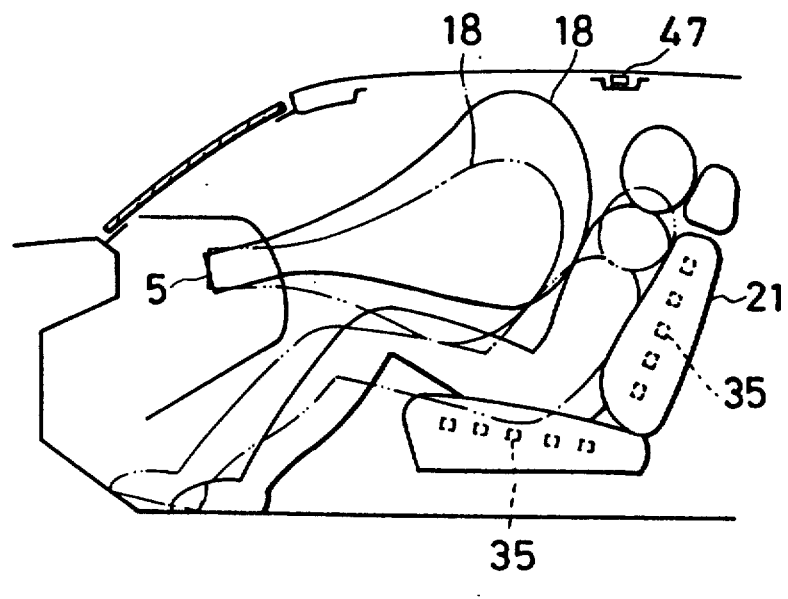
FIG. 45 is a schematic side view showing a relationship between the hip position of the passenger and the angular position of the air bag system.
Figure 46:
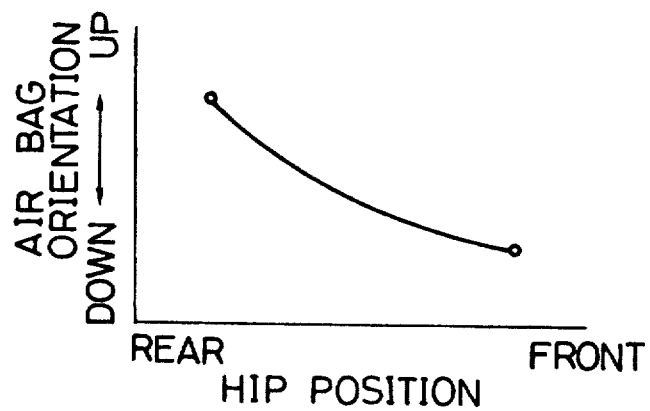
FIG. 46 is a graphical representation showing a relationship between the hip position of the passenger and the angular position of the air bag system.

When the passenger takes a posture leaning against the seat back 21B, namely when his hip position is in a forward position in the seat cushion 21A as shown by a chain line in FIG. 45, the control unit 70 orients the air bag device 5 relatively downwardly as shown by a chain line. Contrarily, the control unit 70 orients the air bag device 5 relatively upwardly as shown by a real line when the passenger takes a relatively upright posture as shown by a real line. As shown in FIG. 46, the control unit 70 controls the position of the air bag device 5 in accordance with the posture or the hip position in a manner that the air bag device is oriented downwardly as the hip position of the passenger is moved forwardly. It follows that the inflated air bag is brought into contact with the passenger's breast at the optimal timing irrespective of the posture of the passenger.

Figure 47:
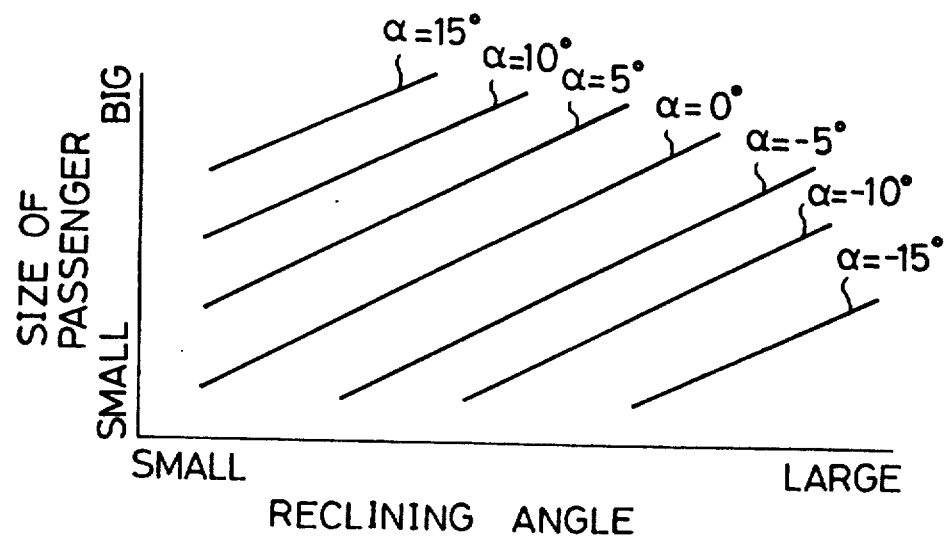
FIG. 47 is a graphical representation showing a relationship among the seat position, the reclining angle and the angular position of the air bag system.

Preferably, the control of the angular position of the air bag device 5 is made based on a combination of two or more factors as aforementioned. For instance, where the control is made in accordance with both the size of the passenger and the reclining angle of the seat 21, an angular offset $\alpha$ of the air bag device 5 from the base position can be illustrated as shown in FIG. 47.

According to the present invention, a transverse angular position about a substantially vertical axis may be controlled as well as the angular position about a substantially horizontal axis as mentioned above.

Hereinafter, there is described a still further embodiment of the invention taking reference with FIG. 48 through FIG. 52.

Figure 48:
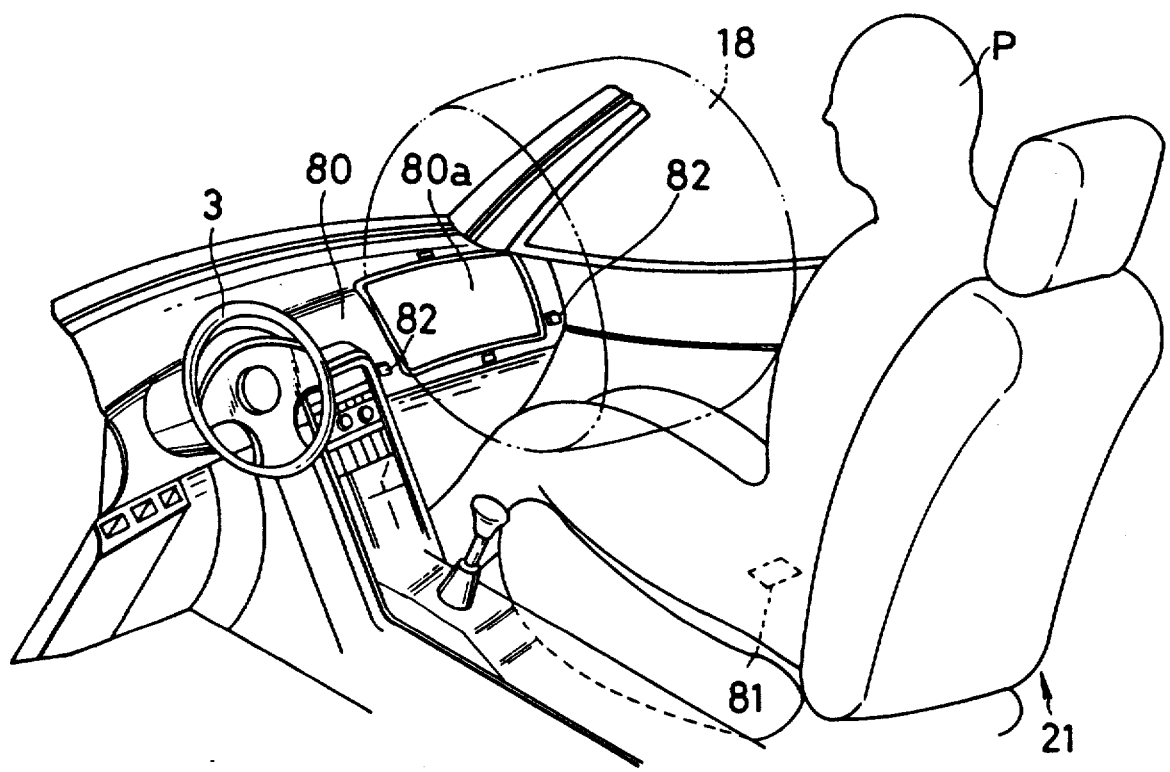
FIG. 48 is a perspective view showing the inside of the passenger compartment in accordance with a further embodiment of the invention.
Figure 49:
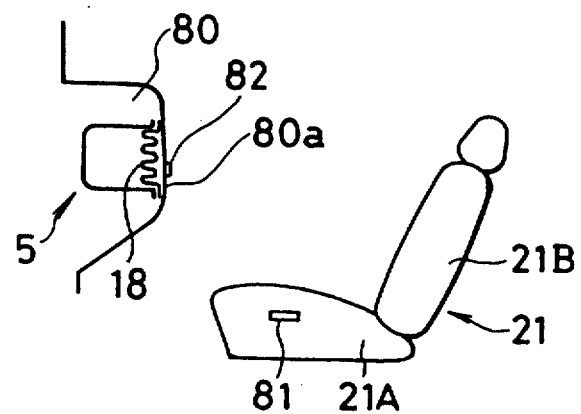
FIG. 49 is a sectional view schematically showing an arrangement of the air bag system in accordance with the embodiment of FIG. 48.

As shown in FIG. 48 and 49, the air bag device 5 is arranged within a front body member or instrument panel 80 just behind a cover portion 80a thereof for a passenger P seated on a driver's assistant seat 21. The seat 21 provided with a seat switch 81 for detecting that the passenger P seats on the seat 21. An object detector 82 is mounted on the panel 80 adjacent to a position where the air bag device 5 is located. The object detector 82 constituted by for instance, an infrared sensor detects an object intervening between the instrument panel 80 and the passenger P, such as a child standing forward of the passenger P, a baggage on a lap of the passenger and the like.

Figure 50:
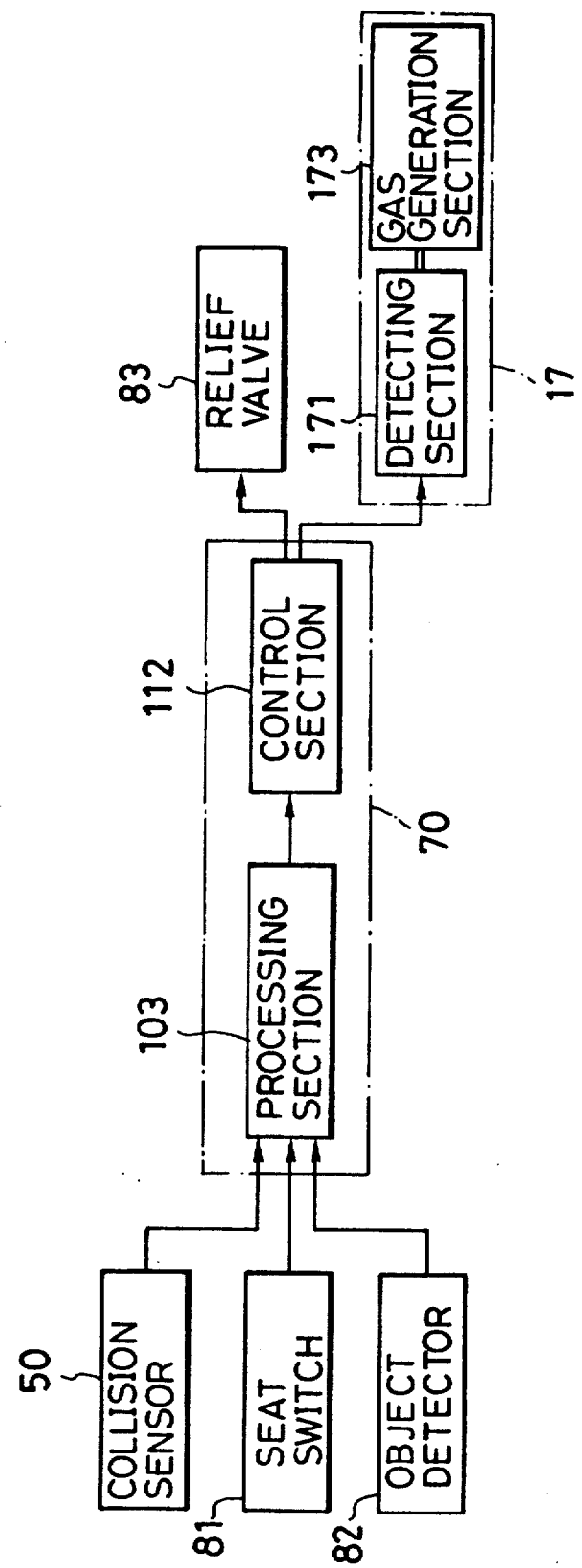
FIG. 50 is a block diagram showing a control unit in accordance with the embodiment of FIG. 48.

Referring to FIG. 50, the control unit 70 receives signals from various sensors including the collision sensor 50, the seat switch 81, and the object detector 82. The processing section 103 processes signals from the sensors and provides the comparator 104 with a resultant output. The control unit 70 is provided with a control section 112 for receiving the output signal from the processing section 103 and producing a control signal to the inflater and a relief valve 83 provided in the air bag device 5 as shown in FIG. 51 for relieving the gas in the air bag 18.

The control unit 70 controls the air bag device 5 in accordance with the seating condition including a circumstantial condition of the passenger based on the signals from the seat switch 81 and the object detector 83.

Figures 51, 52:
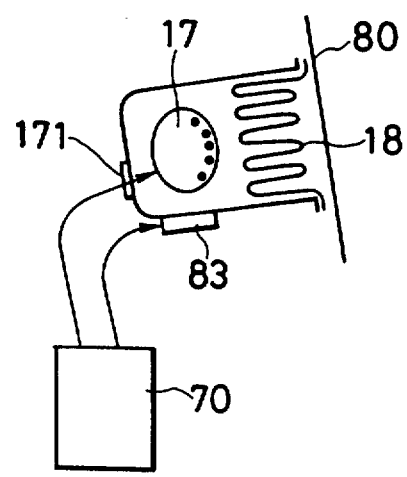
FIG. 51 is a sectional view showing the air bag system.
FIG. 52 is a diagrammatical view showing a relationship between a seat switch, an object detector and a relief valve.

Referring to FIG. 52, there is shown a relationship between an operation of the relief valve 83 by means of the control unit 70 and an operation of the seat switch and the object detector 82.

In situation 1 wherein, for example, the passenger P seats on the seat 21 and a child stands by the passenger, the control unit 70 controls the relief valve to open in case of a collision so that the inflated air bag does not hit the child hard for preventing the child from being injured due to the inflation of the air bag device 5.

In situation 2 wherein the passenger seats on the seat 21 and no objection between the front body member and the passenger, the control unit 70 keep the relief valve close to provide the air bag device 5 with a normal inflation.

In situation 3 wherein there is no passenger on the seat 21 but an object such as a child intervenes between the seat 21 and the front body member or the instrument panel 80, the control unit 70 controls the relief valve 83 to open not to injure the child due to the inflation of the air bag 18.

In situation 4 wherein there is no passenger on the seat and no object intervening, the control unit 70 controls the air bag device 5 not to be inflated even in case of a collision. It will be apparent that various modifications and improvements may be made based on the above descriptions by those skilled in the art without departing from the scope of the claims as attached.

We claim:

1. An air bag system for an automobile comprising:

collision detecting means for detecting a collision of the automobile, gas generating means for generating a gas under pressure, based on an output of said collision detecting means, shock absorbing bag means mounted on a front body member located in front of a seat for receiving the gas from the gas generator to take a predetermined inflated configuration, seating condition detecting means for detecting whether or not a passenger seated on the seat has put a seat belt on, and control means for controlling a time period between a collision and complete inflation of the shock absorbing bag means in accordance with the seating condition of the passenger so that the shock absorbing bag means, when inflated, is brought into an optimal contact with the passenger, the control means advancing timing of the inflation of said shock absorbing bag means when said seating condition detecting means detects that the passenger has not put a seat belt on.

2. An air bag system for an automobile comprising:

collision detecting means for detecting a collision of the automobile, gas generating means for generating a gas under pressure, based on an output of said collision detecting means, shock absorbing bag means mounted on a front body member located in front of a seat for receiving the gas from the gas generator to take a predetermined inflated configuration, seating condition detecting means for detecting a reclining angle of said seat and a position of the seat in a longitudinal direction of the automobile, and control means for controlling a time period between a collision and complete inflation of the shock absorbing bag means in accordance with the seating condition of the passenger so that the shock absorbing bag means, when inflated, is brought into an optimal contact with the passenger.

3. An air bag system as recited in claim 2 wherein the seating condition detecting means detects a size of the passenger.

4. An air bag system as recited in claim 2 wherein the seating condition detecting means detects a posture of the passenger.

5. An air bag system as recited in claim 2 wherein the time period is increased as a reclining angle of the seat is increased.

6. An air bag system as recited in claim 2 wherein the seating condition detecting means detects whether or not there is an object other than the passenger between the seat and the front body member.

7. An air bag system as recited in claim 2 wherein the time period is decreased as a size of the passenger is increased.

8. An air bag system as recited in claim 2 wherein the time period is increased when a hip position of the passenger is located at a rearward position of the seat.

9. An air bag system as recited in claim 2 wherein the control means controls a supply of the gas under pressure from the gas generating means introduced into the shock absorbing bag means.

10. An air bag system as recited in claim 9 wherein the control means is constituted by a pressure adjusting means for adjusting a gas pressure from the gas generating means.

11. An air bag system as recited in claim 10 wherein the pressure adjusting means controls the number of gas discharging passage through which the gas under pressure is introduced into the shock absorbing bag means.

12. An air bag system as recited in claim 10 wherein the pressure adjusting means controls the gas pressure from at least one of the gas generating means.

13. An air bag system as recited in claim 10 wherein the pressure adjusting means increases the gas pressure from the gas generating means as the seat moves forwardly.

14. An air bag system as recited in claim 10 wherein the pressure adjusting means increases the gas pressure from the gas generating means as a reclining angle of the seat is decreased.

15. An air bag system as recited in claim 10 wherein the pressure adjusting means increases the gas pressure from the gas generating means when the passenger does not put a seat belt on.

16. An air bag system as recited in claim 10 wherein the pressure adjusting means increases the gas pressure from the gas generating means when a hip position of the passenger is located at a rearward position of the seat.

17. An air bas system as recited in claim 10 wherein the pressure adjusting means increases the gas pressure from the gas generating means as a temperature of a passenger compartment is decreased.

18. An air bag system for an automobile comprising:

collision detecting means for detecting a collision of the automobile, gas generating means for generating a gas under pressure based on an output of said collision detecting means, shock absorbing bag means mounted on a front body member located in front of a seat for receiving the gas from the gas generator to take a predetermined inflated configuration, seating condition detecting means for detecting a seating condition of a passenger seated on the seat, and control means for controlling a position of the shock absorbing bag means in a longitudinal direction of the automobile in accordance with the seating condition of the passenger to thereby control a distance between the shock absorbing bag means and the passenger so that the shock absorbing bag means, when inflated, is brought into an optimal contact with the passenger.

19. An air bag system as recited in claim 18 wherein the control means controls the position of the shock absorbing bag means in the longitudinal direction during a time period between the collision and the finish of the inflation of the shock absorbing bag means.

20. An air bag system as recited in claim 18 wherein the control means controls a longitudinal position of the front body member on which the shock absorbing bag means is mounted.

21. An air bag system as recited in claim 18 wherein the control means moves the shock absorbing bag means rearwardly as the seat is moved rearwardly.

22. An air bag system as recited in claim 18 wherein the control means moves the shock absorbing bag means rearwardly as a reclining angle of the seat is increased.

23. An air bag system as recited in claim 18 wherein the control means moves the shock absorbing bag means forwardly when the passenger puts a seat belt on.

24. An air bag system as recited in claim 18 wherein the control means moves the shock absorbing bag means forwardly when the passenger is big in size.

25. An air bag system as recited in claim 18 wherein the control means moves the shock absorbing bag means forwardly when a hip position of the passenger is located at a relatively forward position in the seat.

26. An air bag system as recited in claim 18, wherein the control means controls a longitudinal position of the shock absorbing bag means in accordance with a combination of two or more factors of the seating condition.

27. An air bag system for an automobile comprising:
collision detecting means for detecting a collision of the automobile,
gas generating means for generating a gas under pressure based on an output of said collision detecting means,
shock absorbing bag means mounted on a front body member located in front of a seat for receiving the gas from the gas generator to take a predetermined inflated configuration,
seating condition detecting means for detecting a seating condition of a passenger seated on the seat, and
control means for controlling an angular position of the shock absorbing bag means about a transverse axis in an up and down direction of the automobile in accordance with the seating condition of the passenger so that the shock absorbing bag means, when inflated, is brought into an optimal contact with the passenger.

28. An air bag system as recited in claim 27 wherein the control means controls the angular position of the shock absorbing bag mean about the transverse axis in the up and down direction of the automobile during a time period between the collision and the finish of the inflation of the shock absorbing bag means.

29. An air bas system as recited in claim 27 wherein the transverse axis is provided on the front body member.

30. An air bag system as recited in claim 27 wherein the control means swings the shock absorbing bag means upwardly as the seat is moved forwardly.

31. An air bag system as recited in claim 27 wherein the control means swings the shock absorbing bag means downwardly as a reclining angle of the seat is increased.

32. An air bag system as recited in claim 27 wherein the control means swings the shock absorbing bag means upwardly when the passenger does not put a seat belt on.

33. An air bag system as recited in claim 27 wherein the control means swings the shock absorbing bag means downwardly when the passenger is small in size.

34. An air bag system as recited in claim 27 wherein the control means swings the shock absorbing bag means downwardly when a hip position of the passenger is located at a relatively forward position in the seat.

35. An air bag system as recited in claim 27 wherein the control means controls an angular position of the shock absorbing bag means in accordance with a combination of two or more factors of the seating condition.

36. An air bag system for an automobile comprising:
collision detecting means for detecting a collision of the automobile,
gas generating means for generating a gas under pressure based on an output of said collision detecting means,
shock absorbing bag means mounted on a front body member located in front of a seat for receiving the gas from the gas generator to take a predetermined inflated configuration,
seating condition detecting means for detecting a position of the seat in a longitudinal direction of the automobile, and
control means for controlling a quantity of the gas introduced into the shock absorbing bag means in accordance with the seating condition of the passenger so that the shock absorbing bag means, when inflated, is brought into an optimal contact with the passenger.

* * * * *